United States Patent
Jang

(10) Patent No.: US 10,957,910 B2
(45) Date of Patent: Mar. 23, 2021

(54) PARTICULATES OF CONDUCTING POLYMER NETWORK-PROTECTED CATHODE ACTIVE MATERIAL PARTICLES FOR LITHIUM BATTERIES

(71) Applicant: Nanotek Instruments, Inc., Dayton, OH (US)

(72) Inventor: Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 62 days.

(21) Appl. No.: 16/400,585

(22) Filed: May 1, 2019

(65) Prior Publication Data

US 2020/0350589 A1    Nov. 5, 2020

(51) Int. Cl.
| | |
|---|---|
| *H01M 4/62* | (2006.01) |
| *H01M 10/0525* | (2010.01) |
| *H01M 4/139* | (2010.01) |
| *H01M 4/36* | (2006.01) |
| *H01M 4/02* | (2006.01) |

(52) U.S. Cl.
CPC .......... *H01M 4/622* (2013.01); *H01M 4/139* (2013.01); *H01M 4/366* (2013.01); *H01M 4/625* (2013.01); *H01M 10/0525* (2013.01); *H01M 2004/021* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2,798,878 A | 7/1957 | Hummers | |
| 2005/0136330 A1 | 6/2005 | Mao et al. | |
| 2015/0123028 A1* | 5/2015 | Huang | C01B 25/26 252/182.1 |
| 2017/0301950 A1* | 10/2017 | Mimura | H01M 4/661 |
| 2018/0108944 A1* | 4/2018 | Yamakaji | C07D 303/40 |

OTHER PUBLICATIONS

Gurunathan et al., "Synthesis of Hierarchically Porous SnO2 Microspheres and Performance Evaluation as Li-Ion Battery Anode by Using Different Binders" ACS Appl. Mater Inter (2014) vol. 6, No. 19, pp. 16556-16564.

* cited by examiner

*Primary Examiner* — Scott J. Chmielecki

(57) ABSTRACT

The disclosure provides multi-functional cathode particulates for a lithium battery, wherein at least one of the particulates has a diameter from 100 nm to 50 μm and comprises a conducting polymer network composite comprising one or a plurality of primary particles of a cathode active material that are partially or fully encapsulated by, embedded in, dispersed in, or bonded by an electrically and ionically conducting network of cross-linked polymer chains having a lithium ion conductivity from $10^{-8}$ to $5\times10^{-2}$ S/cm and an electron conductivity from $10^{-8}$ to $10^3$ S/cm, wherein the primary particles have a diameter or thickness from 0.5 nm to 20 μm. Also provided is a method of producing such cathode particulates.

38 Claims, 7 Drawing Sheets

PARTICULATES OF CONDUCTING POLYMER NETWORK-PROTECTED CATHODE ACTIVE MATERIAL PARTICLES FOR LITHIUM BATTERIES

FIELD

The present disclosure relates generally to the field of rechargeable lithium battery and, more particularly, to the cathode active materials in the form of particulates containing conducting network of conjugated chains-protected cathode active material particles and the method of producing same.

BACKGROUND

A unit cell or building block of a lithium-ion battery is typically composed of an anode current collector, an anode or negative electrode layer (containing an anode active material responsible for storing lithium therein, a conductive additive, and a resin binder), an electrolyte and porous separator, a cathode or positive electrode layer (containing a cathode active material responsible for storing lithium therein, a conductive additive, and a resin binder), and a separate cathode current collector. The electrolyte is in ionic contact with both the anode active material and the cathode active material. A porous separator is not required if the electrolyte is a solid-state electrolyte.

The binder in the anode layer is used to bond the anode active material (e.g. graphite or Si particles) and a conductive filler (e.g. carbon black particles or carbon nanotube) together to form an anode layer of structural integrity, and to bond the anode layer to a separate anode current collector, which acts to collect electrons from the anode active material when the battery is discharged. In other words, in the negative electrode (anode) side of the battery, there are typically four different materials involved: an anode active material, a conductive additive, a resin binder (e.g. polyvinylidine fluoride, PVDF, or styrene-butadiene rubber, SBR), and an anode current collector (typically a sheet of Cu foil). Typically the former three materials form a separate, discrete anode active material layer (or, simply, anode layer) and the latter one forms another discrete layer (current collector layer). A binder resin (e.g. PVDF or PTFE) is also used in the cathode to bond cathode active materials and conductive additive particles together to form a cathode active layer of structural integrity. The same resin binder also acts to bond this cathode active layer to a cathode current collector (e.g. Al foil).

Historically, lithium-ion batteries actually evolved from rechargeable "lithium metal batteries" that use lithium (Li) metal as the anode and a Li intercalation compound (e.g. $MoS_2$) as the cathode. Li metal is an ideal anode material due to its light weight (the lightest metal), high electronegativity (−3.04 V vs. the standard hydrogen electrode), and high theoretical capacity (3,860 mAh/g). Based on these outstanding properties, lithium metal batteries were proposed 40 years ago as an ideal system for high energy-density applications.

Due to some safety concerns (e.g. lithium dendrite formation and internal shorting) of pure lithium metal, graphite was implemented as an anode active material in place of the lithium metal to produce the current lithium-ion batteries. The past two decades have witnessed a continuous improvement in Li-ion batteries in terms of energy density, rate capability, and safety. However, the use of graphite-based anodes in Li-ion batteries has several significant drawbacks: low specific capacity (theoretical capacity of 372 mAh/g as opposed to 3,860 mAh/g for Li metal), long Li intercalation time (e.g. low solid-state diffusion coefficients of Li in and out of graphite and inorganic oxide particles) requiring long recharge times (e.g. 7 hours for electric vehicle batteries), inability to deliver high pulse power (power density <0.5 kW/kg), and necessity to use pre-lithiated cathodes (e.g. lithium cobalt oxide, as opposed to cobalt oxide), thereby limiting the choice of available cathode materials.

Further, these commonly used cathode active materials have a relatively low specific capacity (typically <220 mAh/g). These factors have contributed to the two major shortcomings of today's Li-ion batteries—a low energy density (typically 150-220 $Wh/kg_{cell}$ and low power density (typically <0.5 kW/kg). In addition, even though the lithium metal anode has been replaced by an intercalation compound (e.g. graphite) and, hence, there is little or no lithium dendrite issue in the lithium-ion battery, the battery safety issue has not gone away. There have been no short of incidents involving lithium-ion batteries catching fire or exploding. To sum it up, battery scientists have been frustrated with the low energy density, inadequate cycle life, and flammability of lithium-ion cells for over three decades!

There have been tremendous efforts made in battery industry and research community to improve existing cathode materials and develop new cathode compositions. However, current and emerging cathode active materials for lithium secondary batteries still suffer from the following serious drawbacks:

(1) The most commonly used cathode active materials (e.g. lithium transition metal oxides) contain a transition metal (e.g. Fe, Mn, Co, Ni, etc.) that is a powerful catalyst that can promote undesirable chemical reactions inside a battery (e.g. decomposition of electrolyte). These cathode active materials also contain a high oxygen content that could assist in the progression of thermal runaway and provide oxygen for electrolyte oxidation, increasing the danger of explosion or fire hazard. This is a serious problem that has hampered the widespread implementation of electric vehicles.

(2) Most of promising organic or polymeric cathode active materials are either soluble in the commonly used electrolytes or are reactive with these electrolytes. Dissolution of active material in the electrolyte results in a continuing loss of the active material. Undesirable reactions between the active material and the electrolyte lead to graduate depletion of the electrolyte and the active material in the battery cell. All these phenomena lead to capacity loss of the battery and shortened cycle life.

(3) The practical capacity achievable with current cathode materials (e.g. lithium iron phosphate and lithium transition metal oxides) has been limited to the range of 150-250 mAh/g and, in most cases, less than 200 mAh/g. Additionally, emerging high-capacity cathode active materials (e.g. $FeF_3$) still cannot deliver a long battery cycle life.

High-capacity cathode active materials, such as metal fluoride, metal chloride, and lithium transition metal silicide, can undergo large volume expansion and shrinkage during the discharge and charge of a lithium battery. These repeated volume changes lead to structural instability of the cathode, breakage of the normally weak bond between the binder resin and the active material, fragmentation of active material particles, delamination between the cathode active material layer and the current collector, and interruption of electron-conducting pathways. These high-capacity cathodes include $CoF_3$, $MnF_3$, $FeF_3$, $VF_3$, $VOF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, etc. High-capacity cathode active materials also include a lithium transition metal silicate, $Li_2MSiO_4$ or $Li_2Ma_xMb_ySiO_4$, wherein M and Ma are selected from Fe, Mn, Co, Ni, V, or VO; Mb is selected from Fe, Mn, Co, Ni, V, Ti, Al, B, Sn, or Bi; and $x+y \leq 1$.

Hence, there is an urgent and continuing need for a new cathode active material and a cathode electrode (e.g. a cathode active material layer) that enable a lithium secondary battery to deliver a long cycle life and higher energy density. There is also a need for a method of readily and easily producing such a material in large quantities. Thus, it is a primary object of the present disclosure to meet these needs and address the issues associated the rapid capacity decay of a lithium battery.

SUMMARY

The disclosure provides a cathode particulate or multiple cathode particulates (herein referred to as multi-functional particulates) and a cathode electrode containing such particulates for a lithium battery and a process or method for producing such particulates and cathode. At least one of the particulates has a diameter from 100 nm to 50 μm and comprises a conducting polymer network composite comprising one or a plurality of primary particles of a cathode active material that are encapsulated by, embedded in, dispersed in, or bonded by an electrically and ionically conducting network of cross-linked conjugated polymer chains having a lithium ion conductivity from $10^{-8}$ S/cm to $5 \times 10^{-2}$ S/cm and an electron conductivity from $10^{-8}$ to $10^3$ S/cm, wherein the primary particles have a diameter or thickness from 0.5 nm to 20 μm. The multi-functional particulate may have a diameter (or shortest dimension) preferably and typically from 500 nm to 30 μm, and more preferably and typically from 1 μm to 20 μm.

Preferably, the conducting network of cross-linked polymer chains contains a conjugated polymer selected from Polyacetylene, Polythiophene, Poly(3-alkylthiophenes), Polypyrrole, Polyaniline, Poly(isothianaphthene), Poly(3,4-ethylenedioxythiophene) (PEDOT), alkoxy-substituted Poly (p-phenylene vinylene), Poly(2,5-bis(cholestanoxy) phenylene vinylene), Poly(p-phenylene vinylene), Poly(2,5-dialkoxy) paraphenylene vinylene, Poly[(1,4-phenylene-1, 2-diphenylvinylene)], Poly(3',7'-dimethyloctyloxy phenylene vinylene), Polyparaphenylene, Polyparaphenylene, Polyparaphenylene sulphide, Polyheptadiyne, Poly (3-hexylthiophene), Poly(3-octylthiophene), Poly(3-cyclohexylthiophene), Poly(3-methyl-4-cyclohexylthiophene), Poly(2,5-dialkoxy-1,4-phenyleneethynylene), Poly(2-decyloxy-1,4-phenylene), Poly(9,9-dioctylfluorene), Polyquinoline, a derivative thereof, a copolymer thereof, a sulfonated version thereof, or a combination thereof. In some preferred embodiments, the conducting polymer network comprises chains of a conjugated polymer selected from polyaniline, polypyrrole, or polythiophene.

In some embodiments, the composite further comprises graphene sheets selected from pristine graphene, graphene fluoride, graphene chloride, graphene bromide, graphene iodide, nitrogenated graphene, hydrogenated graphene, doped graphene, chemically functionalized graphene, a combination thereof, or a combination thereof with graphene oxide or reduced graphene oxide.

In some embodiments, the conducting network of cross-linked conjugated polymer chains is reinforced with a high-strength material selected from carbon nanotubes, carbon nano-fibers, carbon or graphite fibers, graphene sheets, expanded graphite flakes, polymer fibrils, glass fibers, ceramic fibers, metal filaments or metal nano-wires, whiskers, or a combination thereof.

Preferably, the graphene sheets have a lateral dimension (length or width) from 5 nm to 5 μm, more preferably from 10 nm to 1 μm, and most preferably from 10 nm to 300 nm. Shorter graphene sheets allow for easier encapsulation and enable faster lithium ion transport through the inorganic filler-reinforced elastomer-based encapsulating layer.

Preferably, the particulates are substantially or essentially spherical or ellipsoidal in shape. Also preferably, the particulate have a diameter or thickness smaller than 30 μm, more preferably smaller than 20 μm, and most preferably smaller than 10 μm.

The cathode active material particulate may contain a cathode active material selected from an inorganic material, an organic material, a polymeric material, or a combination thereof. The inorganic material may be selected from a metal oxide, metal phosphate, metal silicide, metal selenide, transition metal sulfide, sulfur, lithium polysulfide, selenium, lithium selenide, or a combination thereof.

The inorganic material may be selected from a lithium cobalt oxide, lithium nickel oxide, lithium manganese oxide, lithium vanadium oxide, lithium-mixed metal oxide (such as the well-known NMC, NCA, etc., where N=I, M=Mn, C=Co, and A=Al in these two examples), lithium iron phosphate, lithium manganese phosphate, lithium vanadium phosphate, lithium mixed metal phosphate, lithium metal silicide, or a combination thereof.

In certain preferred embodiments, the inorganic material-based cathode active material is selected from a metal fluoride or metal chloride including the group consisting of $CoF_3$, $MnF_3$, $FeF_3$, $VF_3$, $VOF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, and combinations thereof. In certain preferred embodiments, the inorganic material is selected from a lithium transition metal silicate, denoted as $Li_2MSiO_4$ or $Li_2Ma_xMb_ySiO_4$, wherein M and Ma are selected from Fe, Mn, Co, Ni, V, or VO; Mb is selected from Fe, Mn, Co, Ni, V, Ti, Al, B, Sn, or Bi; and $x+y \leq 1$.

In certain preferred embodiments, the inorganic material is selected from a transition metal dichalcogenide, a transition metal trichalcogenide, or a combination thereof. The inorganic material is selected from $TiS_2$, $TaS_2$, $MoS_2$, $NbSe_3$, $MnO_2$, $CoO_2$, an iron oxide, a vanadium oxide, or a combination thereof.

The cathode active material layer may contain a metal oxide containing vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1 < x < 5$.

The cathode active material layer may contain a metal oxide or metal phosphate, selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

In some embodiments, the inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

The cathode active material layer may contain an organic material or polymeric material selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8-naphthalenetetraol formaldehyde polymer, Hexaazatrinaphtylene (HATN), Hexaazatriphenylene hexacarbonitrile (HAT(CN)$_6$), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAM), calixquinone, Li$_4$C$_6$O$_6$, Li$_2$C$_6$O$_6$, Li$_6$C$_6$O$_6$, or a combination thereof.

The thioether polymer is selected from Poly[methanetetryl-tetra(thiomethylene)](PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(l,4-di(1,3-dithiolan-2-yl)benzene) (PDDTB), poly(tetrahydrobenzodithiophene) (PTHBDT), poly[1,2,4,5-tetrakis(propylthio)benzene] (PTKPTB, or poly[3,4(ethylenedithio)thiophene] (PEDTT).

In other embodiments, the cathode active material layer contains an organic material selected from a phthalocyanine compound, such as copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

The cathode active material is preferably in a form of nanoparticle (spherical, ellipsoidal, and irregular shape), nanowire, nanofiber, nanotube, nanosheet, nanobelt, nanoribbon, nanodisc, nanoplatelet, or nanohorn having a thickness or diameter less than 100 nm. These shapes can be collectively referred to as "particles" unless otherwise specified or unless a specific type among the above species is desired. Further preferably, the cathode active material has a dimension less than 50 nm, even more preferably less than 20 nm, and most preferably less than 10 nm.

In some embodiments, one particle or a cluster of particles may be coated with or embraced by a layer of carbon disposed between the active material particle(s) and the protecting layer (the encapsulating shell) of conducting network of crosslinked chains. Alternatively or additionally, a carbon layer may be deposited to embrace the encapsulated particle or the encapsulated cluster of multiple cathode active material particles.

The particulate may further contain a graphite or carbon material mixed with the active material particles, which are all encapsulated by the encapsulating shell (but not dispersed within this thin layer of conducting network of cross-linked polymer chains). The carbon or graphite material is selected from polymeric carbon, amorphous carbon, chemical vapor deposition carbon, coal tar pitch, petroleum pitch, meso-phase pitch, carbon black, coke, acetylene black, activated carbon, fine expanded graphite particle with a dimension smaller than 100 nm, artificial graphite particle, natural graphite particle, or a combination thereof.

The cathode active material particles may be coated with or embraced by an ion- and/or electron-conducting protective coating (selected from a carbon material, conductive polymer, conductive metal oxide, or conductive metal coating) prior to being encapsulated by the shell.

Preferably and typically, the conducting network of cross-linked polymer chains has a lithium ion conductivity no less than $10^{-6}$ S/cm, more preferably no less than $5 \times 10^{-5}$ S/cm. In certain embodiments, the conducting network of cross-linked polymer chains further contains from 0.1% to 40% by weight (preferably from 1% to 30% by weight) of a lithium ion-conducting additive dispersed in the sulfonated elastomer matrix material.

In some preferred embodiments, the conducting network of cross-linked polymer chains further contains a lithium ion-conducting additive dispersed in an elastomer matrix material, wherein the lithium ion-conducting additive is selected from Li$_2$CO$_3$, Li$_2$O, Li$_2$C$_2$O$_4$, LiOH, LiX, ROCO$_2$Li, HCOLi, ROLi, (ROCO$_2$Li)$_2$, (CH$_2$OCO$_2$Li)$_2$, Li$_2$S, Li$_x$SO$_y$, or a combination thereof, wherein X=F, Cl, I, or Br, R=a hydrocarbon group, 0<x≤1, 1≤y≤4.

In some embodiments, the conducting network of cross-linked polymer chains further contains a lithium ion-conducting additive dispersed therein, wherein the lithium ion-conducting additive contains a lithium salt selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-fluoroalkyl-phosphate (LiPF$_3$(CF$_2$CF$_3$)$_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

The proportion of this lithium ion-conducing additive is preferably from 0.1% to 40% by weight, but more preferably from 1% to 25% by weight. The sum of this additive and other additives preferably occupies from 1% to 40% by weight, more preferably from 3% to 35% by weight, and most preferably from 5% to 25% by weight of the resulting composite weight (the conducting network of cross-linked polymer chains, electron-conducting additive, and lithium ion-conducting additive combined).

In some embodiments, the conducting network of cross-linked polymer chains contains a mixture or blend of a conducting network of cross-linked polymer chains and a lithium ion-conducting polymer selected from poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazenex, Polyvinyl chloride, Polydimethylsiloxane, poly(vinylidene fluoride)-hexafluoropropylene (PVDF-HFP), a sulfonated derivative thereof, or a combination thereof. Sulfonation is herein found to impart improved lithium ion conductivity to a polymer. The proportion of this lithium ion-conducting polymer is preferably from 0.1% to 20% by weight. Mixing or dispersion of an additive or reinforcement species in a conducting network of cross-linked polymer chains may be conducted using solution mixing or melt mixing.

The present disclosure also provides a powder mass of cathode active material for a lithium battery. The powder mass comprises multiple particulates of a cathode active material, wherein at least one particulate is composed of one or a plurality of the cathode active material particles that are encapsulated by a thin layer of conducting network of cross-linked polymer chains. The encapsulating thin layer of conducting network of cross-linked polymer chains has a thickness from 1 nm to 10 μm and a lithium ion conductivity from $10^{-8}$ S/cm to $5 \times 10^{-2}$ S/cm.

The present disclosure also provides a cathode electrode that contains the presently invented conducting network of cross-linked polymer chains-encapsulated cathode material particles, an optional conductive additive (e.g. expanded graphite flakes, carbon black, acetylene black, or carbon nanotube), and an optional resin binder (typically required).

The present disclosure also provides a lithium battery containing an optional cathode current collector (e.g. Al foil), the presently invented cathode electrode as described above, an anode active material layer or anode electrode, an optional anode current collector (e.g. Cu foil), an electrolyte in ionic contact with the anode active material layer and the cathode active material layer and an optional porous separator.

There is no limitation on the type of anode active material that can be used in the anode electrode to partner with the invented cathode. For instance, the anode active material may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles and foil of Li, Li alloy, or surface-stabilized Li particles having at least 60% by weight of lithium element therein; and (h) combinations thereof.

In some preferred embodiments, the anode active material contains a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, or a combination thereof, wherein x=1 to 2. It may be noted that pre-lithiation of an anode active material means that this material has been pre-intercalated by or doped with lithium ions up to a weight fraction from 0.1% to 54.7% of Li in the lithiated product.

The lithium battery may be a lithium-ion battery, lithium metal battery (containing lithium metal or lithium alloy as the main anode active material and containing no intercalation-based anode active material), or lithium-air battery.

The disclosure also provides a method of producing a powder mass of a cathode active material for a lithium battery, the method comprising: (a) mixing particles of an electron-conducting filler and/or a lithium ion-conducting filler and an uncured conducting polymer or its precursor (e.g. monomer or oligomer) in a liquid medium or solvent to form a suspension; (b) dispersing a plurality of particles of a cathode active material in the suspension to form a slurry; and (c) dispensing the slurry and removing the solvent and/or polymerizing/curing the precursor to form the powder mass, wherein the powder mass comprises multiple particulates of the cathode active material, wherein at least one of the particulates comprises one or a plurality of the cathode active material particles which are encapsulated by a thin layer of conducting network of cross-linked polymer chains. The encapsulating conducting network of cross-linked polymer chains has a thickness from 1 nm to 10 μm (preferably from 1 nm to 100 nm), and a lithium ion conductivity from $10^{-7}$ S/cm to $10^{-2}$ S/cm. Preferably, this encapsulating layer material also has an electrical conductivity from $10^{-7}$ S/cm to 100 S/cm when measured at room temperature.

One can disperse an optional electron-conducting filler and/or a lithium ion-conducting filler in a monomer or oligomer (with or without a solvent; monomer itself being capable of serving as a liquid medium) to form a suspension. A chemical reaction may be optionally initiated between filler particles, if any, and the monomer/oligomer at this stage or later. Cathode active material particles are then dispersed in the suspension to form a slurry. Alternatively, the cathode active material particles may be added into the polymer or precursor before or during the step of adding the filler. A micro-encapsulation procedure (e.g. spray-drying) is then conducted to produce droplets (particulates), wherein a particulate can contain one or several cathode active material particles embraced/encapsulated by a shell of conducting network of polymer chains or precursor species (reactive monomers or oligomers). The resulting particulate is then subjected to a polymerization/curing treatment (e.g. via heating and/or UV curing, etc.).

Alternatively, one may dissolve a linear or branched chain conjugated polymer (but uncured or un-crosslinked) in a solvent to form a polymer solution. An electron-conducting additive and/or a lithium ion-conducting additive, if desired, are then added into the polymer solution to form a suspension; particles of the cathode active material can be added concurrently or sequentially. The suspension is then subjected to a micro-encapsulation treatment to form particulates. Curing or cross-linking of the composite is then allowed to proceed.

In certain embodiments, the step of dispensing the slurry and removing the solvent and/or polymerizing/curing the precursor to form the powder mass includes operating a procedure (e.g. micro-encapsulation) selected from pan-coating, air-suspension coating, centrifugal extrusion, vibration-nozzle encapsulation, spray-drying, coacervation-phase separation, interfacial polycondensation and interfacial cross-linking, in-situ polymerization, matrix polymerization, or a combination thereof.

In this method, the step of mixing may include dissolving or dispersing from 0.1% to 40% by weight of a lithium ion-conducting additive in the liquid medium or solvent. The lithium ion-conducting additive may be selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0 < x \leq 1$, $1 \leq y \leq 4$. Alternatively or additionally, the lithium ion-conducting additive contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3$ (CF$_2$CF$_3$)$_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

In certain embodiments, the slurry further contains an electron-conducting polymer selected from polyaniline, polypyrrole, polythiophene, polyfuran, a bi-cyclic polymer, a sulfonated derivative thereof, or a combination thereof. Alternatively or additionally, the slurry further contains a lithium ion-conducting polymer selected from poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazenex, Polyvinyl chloride, Polydimethylsiloxane, poly(vinylidene fluoride)-hexafluoropropylene (PVDF-HFP), a sulfonated derivative thereof, or a combination thereof.

The method may further comprise mixing multiple particulates of the aforementioned cathode active material, a binder resin, and an optional conductive additive to form a cathode electrode, which is optionally coated on a cathode current collector (e.g. Al foil). The method may further comprise combining an anode electrode, the presently invented cathode electrode (positive electrode), an electrolyte, and an optional porous separator into a lithium battery cell.

The presently invented conducting network of cross-linked polymer chains-encapsulated active material particles meet all of the criteria required of a lithium-ion battery cathode material:

(a) The protective shell has a high fracture toughness and high resistance to crack formation to avoid disintegration during repeated cycling.

(b) The shell of conducting network of cross-linked polymer chains is relatively inert (inactive) with respect to the electrolyte. Further, since there is no direct contact between the cathode active material particles and liquid electrolyte, there is no opportunity for the transition metal in the cathode active material to catalyze the decomposition of electrolyte, which otherwise could generate undesirable chemical species (e.g. volatile molecules) inside the battery cell.

(c) The shell material can be both lithium ion-conducting and electron-conducting.

(d) The encapsulating shell is capable of preventing any organic cathode active material or certain inorganic cathode active material (e.g. S, Se, lithium polysulfide, or lithium polyselenide) from getting dissolved in a liquid electrolyte and, as such, is capable of helping to prevent the shuttle effect or other capacity-decaying mechanisms from occurring.

DESCRIPTION OF THE PREFERRED EMBODIMENTS

This disclosure is directed at a cathode active material layer (positive electrode layer, not including the cathode current collector) for a lithium secondary battery. This positive electrode comprises a cathode active material that is in a form of a shell-protected particulate, wherein the shell comprises a conducting network of cross-linked polymer chains. The battery is preferably a secondary battery based on a non-aqueous electrolyte, a polymer gel electrolyte, an ionic liquid electrolyte, a quasi-solid electrolyte, or a solid-state electrolyte. The shape of a lithium secondary battery can be cylindrical, square, button-like, etc. The present disclosure is not limited to any battery shape or configuration or any type of electrolyte.

Figure 1A:
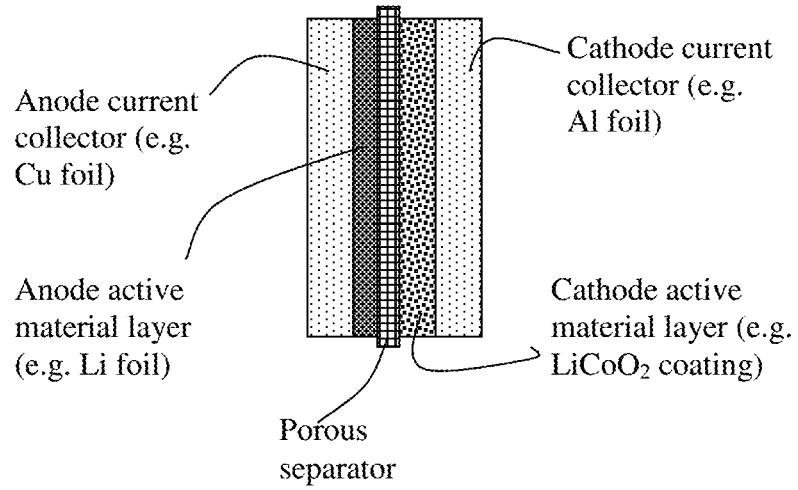
FIG. 1(A) Schematic of a prior art lithium battery cell, wherein the anode layer is a thin Li foil and the cathode is composed of particles of a cathode active material, a conductive additive (not shown) and a resin binder (not shown).
Figure 1B:
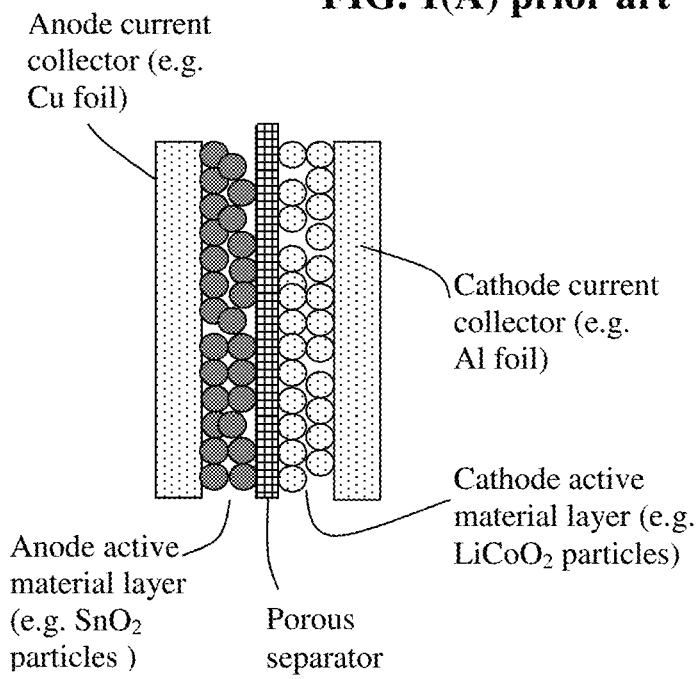
FIG. 1(B) Schematic of a prior art lithium-ion battery; the anode layer being composed of particles of an anode active material, a conductive additive (not shown) and a resin binder (not shown).

As illustrated in FIG. 1(B), a lithium-ion battery cell is typically composed of an anode current collector (e.g. Cu foil), an anode or negative electrode active material layer (i.e. anode layer typically containing particles of an anode active material, conductive additive, and binder), a porous separator and/or an electrolyte component, a cathode or positive electrode active material layer (containing a cathode active material, conductive additive, and resin binder), and a cathode current collector (e.g. Al foil). More specifically, the cathode layer comprises particles of a cathode active material, a conductive additive (e.g. carbon black particles), and a resin binder (e.g. SBR or PVDF). This cathode layer is typically 50-300 μm thick (more typically 100-200 μm) to give rise to a sufficient amount of current per unit electrode area.

In another cell configuration, as illustrated in FIG. 1(A), the anode active material is a lithium metal foil or a layer of packed Li particles supported on an anode current collector, such as a sheet of copper foil. This can be a lithium metal secondary battery, lithium-sulfur battery, or lithium-selenium battery, etc.

In order to obtain a higher energy density lithium-ion cell, the anode in FIG. 1(B) can be designed to contain higher-capacity anode active materials having a composition formula of $Li_aA$ (A is a metal or semiconductor element, such as Al and Si, and "a" satisfies $0<a\leq5$). These materials are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g).

Figure 2A:
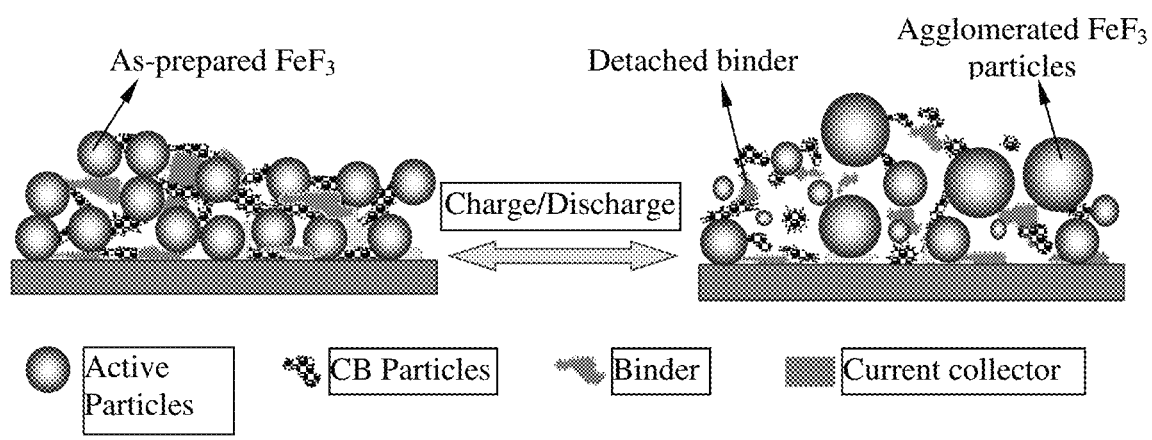
FIG. 2(A) Schematic illustrating the notion that expansion/shrinkage of electrode active material particles, upon lithium insertion and de-insertion during discharge/charge of a prior art lithium-ion battery, can lead to detachment of resin binder from the particles, interruption of the conductive paths formed by the conductive additive, and loss of contact with the current collector.

As schematically illustrated in FIG. 2(A), one major problem in the current lithium battery is the notion that active material particles can get fragmented and the binder resin can detach from both the active material particles and conductive additive particles due to repeated volume expansion/shrinkage of the active material particles during the charge and discharge cycles. These binder detachment and particle fragmentation phenomena lead to loss of contacts between active material particles and conductive additives and loss of contacts between the active material and its current collector. These adverse effects result in a significantly shortened charge-discharge cycle life.

We have solved these challenging issues that have troubled battery designers and electrochemists alike for more than 30 years by developing a new class of cathode active materials. The cathode active material layer comprises multiple cathode active material particles that are partially or fully embraced or encapsulated by a conducting network of cross-linked polymer chains having a lithium ion conductivity no less than $10^{-8}$ S/cm at room temperature (preferably and more typically from $1\times10^{-5}$ S/cm to $5\times10^{-2}$ S/cm).

Preferably, the conducting network of cross-linked polymer chains contains a conjugated polymer selected from Polyacetylene, Polythiophene, Poly(3-alkylthiophenes), Polypyrrole, Polyaniline, Poly(isothianaphthene), Poly(3,4-ethylenedioxythiophene) (PEDOT), alkoxy-substituted Poly (p-phenylene vinylene), Poly(2,5-bis(cholestanoxy) phenylene vinylene), Poly(p-phenylene vinylene), Poly(2,5-dialkoxy) paraphenylene vinylene, Poly[(1,4-phenylene-1,2-diphenylvinylene)], Poly(3',7'-dimethyloctyloxy phenylene vinylene), Polyparaphenylene, Polyparaphenylene, Polyparaphenylene sulphide, Polyheptadiyne, Poly(3-hexylthiophene), Poly(3-octylthiophene), Poly(3-cyclohexylthiophene), Poly(3-methyl-4-cyclohexylthiophene), Poly(2,5-dialkoxy-1,4-phenyleneethynylene), Poly(2-decyloxy-1,4-phenylene), Poly(9,9-dioctylfluorene), Polyquinoline, a derivative thereof, a copolymer thereof, a sulfonated version thereof, or a combination thereof. In some preferred embodiments, the conducting polymer network comprises chains of a conjugated polymer selected from polyaniline, polypyrrole, or polythiophene.

Figure 2B:
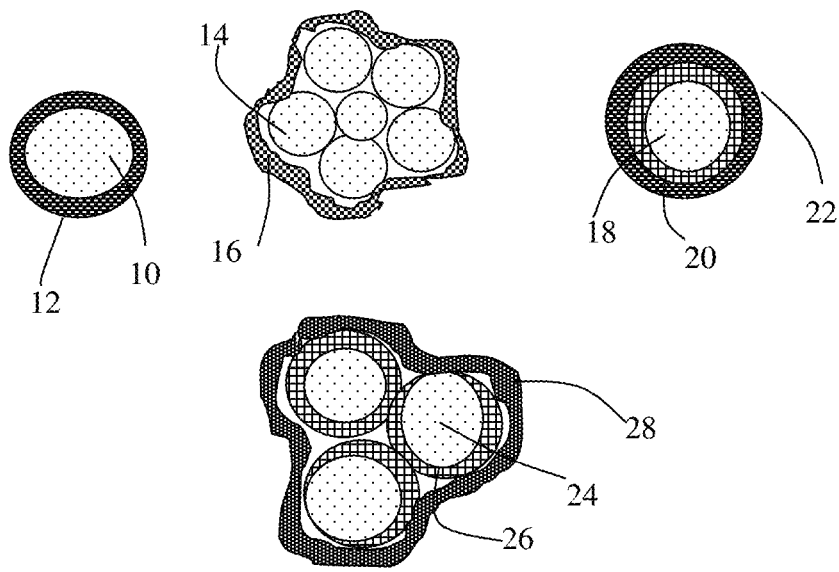
FIG. 2(B) Several different types of particulates containing conducting network of cross-linked polymer chains-encapsulated cathode active material particles. The conjugated polymer chains may reside inside the encapsulating shell as well; not just in the shell.

As illustrated in FIG. 2(B), the present disclosure provides four major types of particulates of conducting network of cross-linked polymer chains-encapsulated cathode active material particles. The first one is a single-particle particulate containing a cathode active material core 10 encapsulated by a shell of a conducting network of cross-linked polymer chains 12. The second is a multiple-particle particulate containing multiple cathode active material particles 14 (e.g. $FeF_3$ particles), optionally along with other conductive materials (e.g. particles of graphite or hard carbon, not shown), which are encapsulated by a shell 16 comprising a conducting network of cross-linked polymer chains. The third is a single-particle particulate containing a cathode active material core 18 coated by a carbon or graphene layer 20 (or other conductive material) further encapsulated by a conducting network of cross-linked polymer chains 22. The fourth is a multiple-particle particulate containing multiple cathode active material particles 24 (e.g. $FeF_3$ particles) coated with a conductive protection layer 26 (carbon, graphene, etc.), optionally along with other active materials or conductive additive, which are encapsulated by a conducting network of cross-linked polymer chains 28.

The application of the presently invented conducting network of cross-linked polymer chain encapsulation approach is not limited to any particular class of cathode active materials. The cathode active material layer may contain a cathode active material selected from an inorganic material, an organic material, a polymeric material, or a combination thereof. The inorganic material may be selected from a metal oxide, metal phosphate, metal silicide, metal selenide, transition metal sulfide, or a combination thereof.

The inorganic material, as a cathode active material, may be selected from a lithium cobalt oxide, lithium nickel oxide, lithium manganese oxide, lithium vanadium oxide, lithium-mixed metal oxide (e.g. NMC and NCA), lithium iron phosphate, lithium manganese phosphate, lithium vanadium phosphate, lithium mixed metal phosphate, lithium metal silicide, or a combination thereof.

In certain embodiments, the inorganic filler for reinforcing the conducting network of cross-linked polymer chains may be selected from an oxide, carbide, boride, nitride, sulfide, phosphide, or selenide of a transition metal, a lithiated version thereof, or a combination thereof. Preferably, the transition metal is selected from Ti, V, Cr, Mn, Fe, Co, Ni, Cu, Zn, Y, Zr, Nb, Mo, Pd, Ag, Cd, La, Ta, W, Pt, Au, Hg, a combination thereof, or a combination thereof with Al, Ga, In, Sn, Pb, Sb, or Bi.

In certain preferred embodiments, the conducting network of cross-linked polymer chains further contains an electron-conducting filler dispersed in the conducting network of cross-linked polymer chains, wherein the electron-conducting filler is selected from a carbon nanotube, carbon nano-fiber, nanocarbon particle, metal nanoparticle, metal nano-wire, electron-conducting polymer, graphene, or a combination thereof. The graphene may be preferably selected from pristine graphene, graphene oxide, reduced graphene oxide, graphene fluoride, graphene chloride, nitrogenated graphene, hydrogenated graphene, doped graphene, functionalized graphene, or a combination thereof and the graphene preferably comprises single-layer graphene or few-layer graphene, wherein the few-layer graphene is defined as a graphene platelet formed of 2-10 graphene planes. More preferably, the graphene sheets contain 1-5 graphene planes, most preferably 1-3 graphene planes (i.e. single-layer, double-layer, or triple-layer graphene).

Preferably and typically, the conducting network of cross-linked polymer chains, when measured without any additive, has a lithium ion conductivity from $10^{-7}$ S/cm to $5\times10^{-2}$ S/cm, more preferably and typically greater than $10^{-5}$ S/cm, further more preferably and typically greater than $10^{-4}$ S/cm, and most preferably no less than $10^{-3}$ S/cm. In some embodiments, the conducting network of cross-linked polymer chains further contains from 0.1% to 40% (preferably 1% to 35%) by weight of a lithium ion-conducting additive dispersed therein.

The electron-conducting filler may be selected from a carbon nanotube (CNT), carbon nano-fiber, graphene, nano-carbon particles, metal nanowires, etc. A graphene sheet or nanographene platelet (NGP) composed of one basal plane (graphene plane) or multiple basal planes stacked together in the thickness direction. In a graphene plane, carbon atoms occupy a 2-D hexagonal lattice in which carbon atoms are bonded together through strong in-plane covalent bonds. In the c-axis or thickness direction, these graphene planes may be weakly bonded together through van der Waals forces. An NGP can have a platelet thickness from less than 0.34 nm (single layer) to 100 nm (multi-layer). For the present electrode use, the preferred thickness is <10 nm, more preferably <3 nm (or <10 layers), and most preferably single-layer graphene. Thus, the presently invented sulfonated elastomer/graphene composite shell preferably contains mostly single-layer graphene, but could make use of some few-layer graphene (less than 10 layers or 10 graphene planes). The graphene sheet may contain a small amount (typically <25% by weight) of non-carbon elements, such as hydrogen, nitrogen, fluorine, and oxygen, which are attached to an edge or surface of the graphene plane.

Graphene sheets may be oxidized to various extents during their preparation, resulting in graphite oxide (GO) or graphene oxide. Hence, in the present context, graphene preferably or primarily refers to those graphene sheets containing no or low oxygen content; but, they can include GO of various oxygen contents. Further, graphene may be fluorinated to a controlled extent to obtain graphite fluoride, or can be doped using various dopants, such as boron and nitrogen.

Graphite oxide may be prepared by dispersing or immersing a laminar graphite material (e.g., powder of natural flake graphite or synthetic graphite) in an oxidizing agent, typically a mixture of an intercalant (e.g., concentrated sulfuric acid) and an oxidant (e.g., nitric acid, hydrogen peroxide, sodium perchlorate, potassium permanganate) at a desired temperature (typically 0-70° C.) for a sufficient length of time (typically 30 minutes to 5 days). In order to reduce the time required to produce a precursor solution or suspension, one may choose to oxidize the graphite to some extent for a shorter period of time (e.g., 30 minutes) to obtain graphite intercalation compound (GIC). The GIC particles are then exposed to a thermal shock, preferably in a temperature range of 600-1,100° C. for typically 15 to 60 seconds to obtain exfoliated graphite or graphite worms, which are optionally (but preferably) subjected to mechanical shearing (e.g. using a mechanical shearing machine or an ultrasonicator) to break up the graphite flakes that constitute a graphite worm. The un-broken graphite worms or individual graphite flakes are then re-dispersed in water, acid, or organic solvent and ultrasonicated to obtain a graphene polymer solution or suspension.

The pristine graphene material is preferably produced by one of the following three processes: (A) Intercalating the graphitic material with a non-oxidizing agent, followed by a thermal or chemical exfoliation treatment in a non-oxidizing environment; (B) Subjecting the graphitic material to a supercritical fluid environment for inter-graphene layer penetration and exfoliation; or (C) Dispersing the graphitic material in a powder form to an aqueous solution containing a surfactant or dispersing agent to obtain a suspension and subjecting the suspension to direct ultrasonication.

In Procedure (A), a particularly preferred step comprises (i) intercalating the graphitic material with a non-oxidizing agent, selected from an alkali metal (e.g., potassium, sodium, lithium, or cesium), alkaline earth metal, or an alloy, mixture, or eutectic of an alkali or alkaline metal; and (ii) a chemical exfoliation treatment (e.g., by immersing potassium-intercalated graphite in ethanol solution).

In Procedure (B), a preferred step comprises immersing the graphitic material to a supercritical fluid, such as carbon dioxide (e.g., at temperature T>31° C. and pressure P>7.4 MPa) and water (e.g., at T>374° C. and P>22.1 MPa), for a period of time sufficient for inter-graphene layer penetration (tentative intercalation). This step is then followed by a sudden de-pressurization to exfoliate individual graphene layers. Other suitable supercritical fluids include methane, ethane, ethylene, hydrogen peroxide, ozone, water oxidation (water containing a high concentration of dissolved oxygen), or a mixture thereof.

In Procedure (C), a preferred step comprises (a) dispersing particles of a graphitic material in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce the separated nano-scaled platelets, which are pristine, non-oxidized NGPs.

Reduced graphene oxide can be produced with an oxygen content no greater than 25% by weight, preferably below 20% by weight, further preferably below 5%. Typically, the oxygen content is between 5% and 20% by weight. The oxygen content can be determined using chemical elemental analysis and/or X-ray photoelectron spectroscopy (XPS).

The laminar graphite materials used in the prior art processes for the production of the GIC, graphite oxide, and subsequently made exfoliated graphite, flexible graphite sheets, and graphene platelets are, in most cases, natural graphite. However, the present disclosure is not limited to natural graphite. The starting material may be selected from the group consisting of natural graphite, artificial graphite (e.g., highly oriented pyrolytic graphite, HOPG), graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof. All of these materials contain graphite crystallites that are composed of layers of graphene planes stacked or bonded together via van der Waals forces. In natural graphite, multiple stacks of graphene planes, with the graphene plane orientation varying from stack to stack, are clustered together. In carbon fibers, the graphene planes are usually oriented along a preferred direction. Generally speaking, soft carbons are carbonaceous materials obtained from carbonization of liquid-state, aromatic molecules. Their aromatic ring or graphene structures are more or less parallel to one another, enabling further graphitization. Hard carbons are carbonaceous materials obtained from aromatic solid materials (e.g., polymers, such as phenolic resin and polyfurfuryl alcohol). Their graphene structures are relatively randomly oriented and, hence, further graphitization is difficult to achieve even at a temperature higher than 2,500° C. But, graphene sheets do exist in these carbons.

Graphene sheets may be oxidized to various extents during their preparation, resulting in graphite oxide or graphene oxide (GO). Hence, in the present context, graphene preferably or primarily refers to those graphene sheets containing no or low oxygen content; but, they can include GO of various oxygen contents. Further, graphene may be fluorinated to a controlled extent to obtain graphene fluoride.

Pristine graphene may be produced by direct ultrasonication (also known as liquid phase production) or supercritical fluid exfoliation of graphite particles. These processes are well-known in the art. Multiple pristine graphene sheets may be dispersed in water or other liquid medium with the assistance of a surfactant to form a suspension.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. "*Halogenated Graphenes: Rapidly Growing Family of Graphene Derivatives*" ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ (2≤x≤24) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers of graphene planes (hexagonal carbon atom planes), it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultra-sonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

In some embodiments, the sulfonated elastomer further contains a lithium ion-conducting additive dispersed therein. The lithium ion-conducting additive may be selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, 0<x≤1, 1≤y≤4.

Alternatively, the lithium ion-conducting additive may contain a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl) imide, lithium bis(fluorosulfonyl)imide, lithium trifluoromethanesulfonimide (LiTFSI), an ionic liquid-based lithium salt, or a combination thereof.

In some embodiments, the lithium ion-conducting additive or filler is a lithium ion-conducting polymer selected from poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazenex, Polyvinyl chloride, Polydimethylsiloxane, poly(vinylidene fluoride)-hexafluoropropylene (PVDF-HFP), a derivative thereof (e.g. sulfonated versions), or a combination thereof.

Figure 2C:
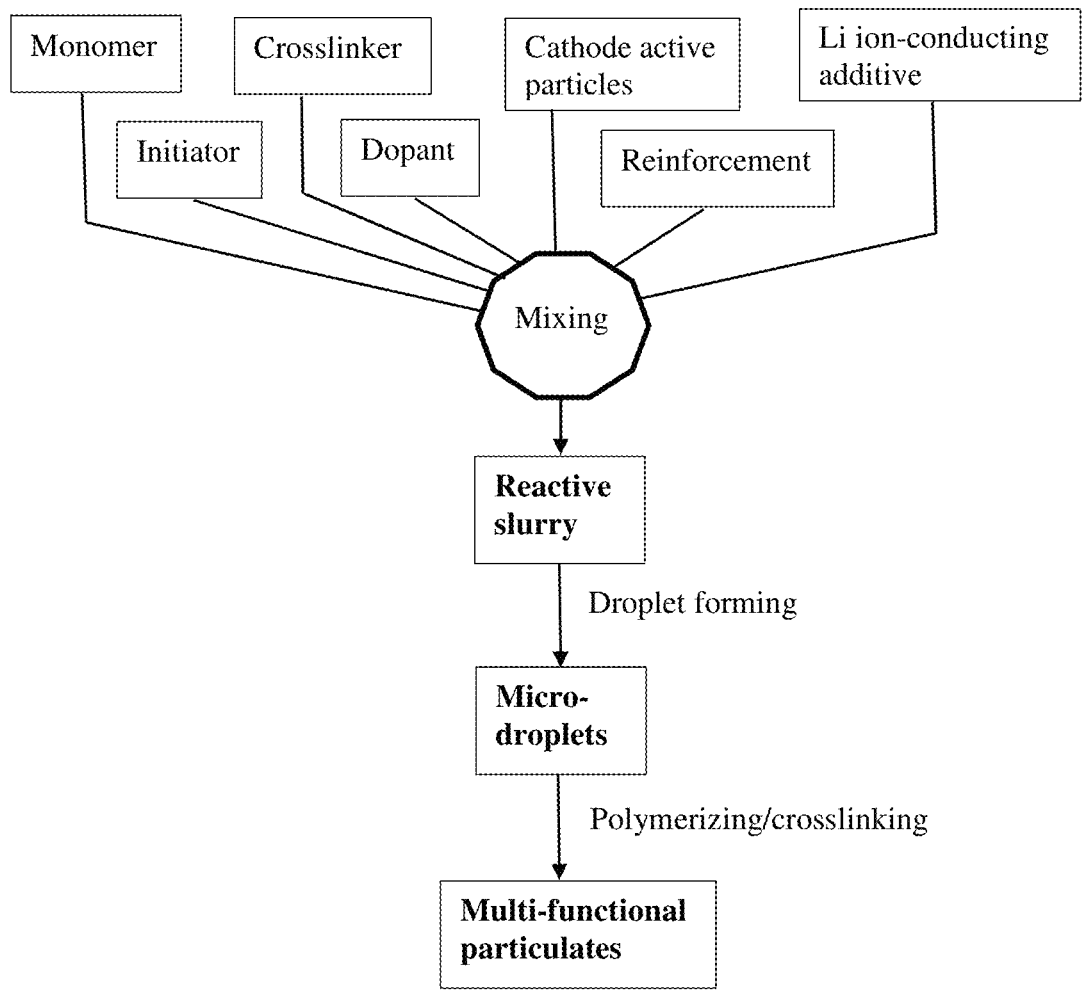
FIG. 2(C) A flow chart illustrating some preferred processes for producing particulates of conducting polymer network chain-protected cathode particles.

The present disclosure also provides a method of producing multi-functional particulates of composites composed of cathode active material particles embedded in, dispersed in, encapsulated by, or bonded by a network of cross-linked conducting polymer chains for a lithium battery. As schematically illustrated in FIG. 2(C) the method comprises mixing reactants (monomer, initiator, curing or crosslinking agent, and optional dopants), primary particles of a cathode active material, optional reinforcement material, and optional lithium ion-conducting additive to form a reactive slurry. One may mix these ingredients sequentially or concurrently. For instance, one may mix all of these ingredients to form the reactive slurry in one pot (one container) all at once and then rapidly form the reactive slurry into micro-droplets, allowing the reactants to react with one another for polymerizing and crosslinking to form the conductive networks of crosslinked polymer chains. The cathode active material particles are dispersed in, embedded in, bonded by, or encapsulated by the conductive networks of crosslinked polymer chains.

Alternatively, one may first mix certain ingredient(s) in one pot and other ingredients in the other pot(s) and then combine them together in one pot. For instance, one may mix the monomer and the initiator in one pot, allowing the mixture to proceed to form a reactive oligomer (low molecular weight chains). A separate pot may be used to contain the curing agent (crosslinker). The primary particles of cathode active material and other ingredients may be dispersed into either pot or both pots. The ingredients in two pots are then combined together and then heated or radiation-exposed to initiate the polymerization and crosslinking reactions. Many different sequences of mixing may be conducted. Certain ingredients may play dual or multiple functions; e.g. phytic acid can be a crosslinker and a dopant for a monomer such as aniline and pyrrole.

In some embodiments, the method comprises (A) dispersing a plurality of primary particles of a cathode active material having a diameter or thickness from 0.5 nm to 20 μm in an uncured conjugated polymer, reactive monomer, or growing oligomer in a liquid state (e.g. an oxidative initiator, a cross-linking agent, and a monomer in a liquid state) to form a reactive slurry; (B) forming the slurry into micro-droplets and curing the conjugated polymer or polymerizing and cross-linking the reactive monomer or growing oligomer to form the multi-functional particulates.

In certain embodiments, the multiple micro-droplets of conducting polymer network-encapsulated cathode active material particles are produced by operating a procedure selected from pan-coating, air-suspension coating, centrifugal extrusion, vibration-nozzle encapsulation, spray-drying, coacervation-phase separation, interfacial polycondensation and interfacial cross-linking, in-situ polymerization, matrix polymerization, extrusion and pelletizing, or a combination thereof.

There are three broad categories of micro-encapsulation methods that can be implemented to produce conducting polymer network embedded or encapsulated anode particles (the micro-droplets): physical methods, physico-chemical methods, and chemical methods. The physical methods include pan-coating, air-suspension coating, centrifugal extrusion, vibration nozzle, and spray-drying methods. The physico-chemical methods include ionotropic gelation and coacervation-phase separation methods. The chemical methods include interfacial polycondensation, interfacial cross-linking, in-situ polymerization, and matrix polymerization. In all of these methods, polymerization and/or crosslinking may be allowed to proceed during and/or after the micro-droplet formation procedure.

Pan-coating method: The pan coating process involves tumbling the cathode active material primary particles in a pan or a similar device while the matrix material (e.g. monomer/oligomer liquid or uncured polymer/solvent solution) is applied slowly until a desired amount of matrix is attained.

Air-suspension coating method: In the air suspension coating process, the solid primary particles of cathode active material are dispersed into the supporting air stream in an encapsulating chamber. A controlled stream of a reactive precursor solution (e.g. polymer or its monomer or oligomer dissolved in a solvent; or its monomer or oligomer alone in a liquid state) is concurrently introduced into this chamber, allowing the solution to hit and coat/embed the suspended particles. These suspended particles are encapsulated by or embedded in the reactive precursor (monomer, oligomer, etc. which is polymerized/cured concurrently or subsequently) while the volatile solvent is removed, leaving behind a composite comprising a matrix of conducting network polymer and cathode active material particles. This process may be repeated several times until the required parameters, such as full-encapsulation, are achieved. The air stream which supports the cathode particles also helps to dry them, and the rate of drying is directly proportional to the temperature of the air stream, which can be adjusted for optimized polymer network amount.

In a preferred mode, the particles in the encapsulating zone portion may be subjected to re-circulation for repeated coating. Preferably, the encapsulating chamber is arranged such that the particles pass upwards through the encapsulating zone, then are dispersed into slower moving air and sink back to the base of the encapsulating chamber, enabling repeated passes of the particles through the encapsulating zone until the desired encapsulating matrix amount is achieved.

Centrifugal extrusion: Primary cathode particles may be embedded in a polymer network or precursor material using a rotating extrusion head containing concentric nozzles. In this process, a stream of core fluid (slurry containing anode particles dispersed in a solvent) is surrounded by a sheath of shell solution or melt containing the polymer or precursor. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry. A high production rate can be achieved. Up to 22.5 kg of microcapsules can be produced per nozzle per hour and extrusion heads containing 16 nozzles are readily available.

Vibrational nozzle encapsulation method: matrix-encapsulation of cathode particles can be conducted using a laminar flow through a nozzle and vibration of the nozzle or the liquid. The vibration has to be done in resonance with the Rayleigh instability, leading to very uniform droplets. The liquid can consist of any liquids with limited viscosities (1-50,000 mPa·s): emulsions, suspensions or slurry containing the anode active material particles and the polymer or precursor.

Spray-drying: Spray drying may be used to encapsulate active particles when the particles are suspended in a melt or polymer/precursor solution to form a suspension. In spray drying, the liquid feed (solution or suspension) is atomized to form droplets which, upon contacts with hot gas, allow solvent to get vaporized and thin polymer shell or matrix to fully embrace the particles.

Coacervation-phase separation: This process consists of three steps carried out under continuous agitation:
  (a) Formation of three immiscible chemical phases: liquid manufacturing vehicle phase, core material phase and encapsulation material phase. The cathode primary particles are dispersed in a solution of the encapsulating polymer or precursor. The encapsulating material phase, which is an immiscible polymer in liquid state, is formed by (i) changing temperature in polymer solution, (ii) addition of salt, (iii) addition of non-solvent, or (iv) addition of an incompatible polymer in the polymer solution.
  (b) Deposition of encapsulation material: cathode particles being dispersed in the encapsulating polymer solution, encapsulating polymer/precursor coated around cathode particles, and deposition of liquid polymer embracing around cathode particles by polymer adsorbed at the interface formed between core material and vehicle phase; and
  (c) Hardening of encapsulating shell material: shell material being immiscible in vehicle phase and made rigid via thermal, cross-linking, or dissolution techniques.

Interfacial polycondensation and interfacial cross-linking: Interfacial polycondensation entails introducing the two reactants to meet at the interface where they react with each other. This is based on the concept of the Schotten-Baumann reaction between an acid chloride and a compound containing an active hydrogen atom (such as an amine or alcohol), polyester, polyurea, polyurethane, or urea-urethane condensation. Under proper conditions, thin flexible encapsulating shell (wall) forms rapidly at the interface. A suspension of the cathode particles and a diacid chloride are emulsified in water and an aqueous solution containing an amine and a polyfunctional isocyanate is added. A base may be added to neutralize the acid formed during the reaction. Condensed polymer shells form instantaneously at the interface of the emulsion droplets. Interfacial cross-linking is derived from interfacial polycondensation, wherein cross-linking occurs between growing polymer chains and a multi-functional chemical groups to form a polymer shell material.

In-situ polymerization: In some micro-encapsulation processes, cathode particles are fully embedded in a monomer or oligomer first. Then, direct polymerization of the monomer or oligomer is carried out with the presence of these material particles dispersed therein.

Matrix polymerization: This method involves dispersing and embedding cathode primary particles in a polymeric matrix during formation of the particles. This can be accomplished via spray-drying, in which the particles are formed by evaporation of the solvent from the matrix material. Another possible route is the notion that the solidification of the matrix is caused by a chemical change.

In summary, in certain embodiments, the disclosure provides a method of producing a cathode electrode comprising multiple particulates, at least one of the particulates has a diameter from 100 nm to 50 μm and comprises a conducting polymer network composite comprising one or a plurality of primary particles of a cathode active material that are encapsulated by, embedded in, dispersed in, or bonded by an electrically and ionically conducting network of cross-linked polymer chains having a lithium ion conductivity from $10^{-8}$ to $5\times10^{-2}$ S/cm and an electron conductivity from $10^{-8}$ to $10^3$ S/cm, wherein said primary particles have a diameter or thickness from 0.5 nm to 20 μm. In certain embodiments, the method comprises: (A) dispersing a plurality of primary particles of a cathode active material, having a diameter or thickness from 0.5 nm to 20 μm, in a liquid mixture of a monomer or oligomer for a conjugated polymer, an initiator, and a cross-linking agent to form a reactive slurry; (B) forming the reactive slurry into micro-droplets and polymerizing and curing the monomer or oligomer in the micro-droplets to form multiple particulates; and (C) mixing the multiple particulates with a binder and an optional conductive additive to form the cathode electrode. The reactive mixture may further comprise a dopant, a reinforcement material, a lithium ion-conducting additive, an electron-conducting additive, or a combination thereof.

In some embodiments, the reactive slurry further comprises a high-strength material selected from carbon nanotubes, carbon nano-fibers, carbon or graphite fibers, graphene sheets, expanded graphite flakes, polymer fibrils, glass fibers, ceramic fibers, metal filaments or metal nanowires, or a combination thereof. Some of these high-strength materials are electron-conducting.

The step (B) of forming micro-droplets may comprise a procedure selected from pan-coating, air-suspension coating, centrifugal extrusion, vibration-nozzle encapsulation, spray-drying, coacervation-phase separation, interfacial polycondensation or interfacial cross-linking, in-situ polymerization, matrix polymerization, extrusion and palletization, or a combination thereof.

In certain embodiments, the micro-droplets contain water or a liquid solvent and the method further comprises a step of removing said water or solvent.

EXAMPLE 1

Production of PEDOT:PSS Networks-Embedded Cathode Particulates

Several types of anode active materials in a fine powder form were investigated. These include $MnF_3$, $FeF_3$, lithium iron phosphate (LFP), and NMC particles, which are used as examples to illustrate the best mode of practice. These active materials were either prepared in house or purchased from commercial sources.

Poly(3,4-ethylenedioxythiophene):polystyrene sulfonate (PEDOT:PSS) is a polymer mixture of two ionomers. One component is made up of sodium polystyrene sulfonate (PSS), which is a sulfonated polystyrene. Part of the sulfonyl groups are deprotonated and carry a negative charge. The other component poly(3,4-ethylenedioxythiophene) or PEDOT is a conjugated polymer, polythiophene, which carries positive charges. Together the two charged polymers form a macromolecular salt. The PEDOT/PSS is initially soluble in water. If a curing agent is used, the polymer may be further cured to increase the degree of cross-linking.

Primary particles of a cathode active material were dispersed in a PEDOT/PSS-water solution to form a slurry (2-8% by wt. solid content), which was spray-dried to form micro-droplets of PEDOT/PSS-embedded cathode active material particles.

EXAMPLE 2

Cathode Particulates Containing Primary Particles of $CuF_2$ and NCA, Embedded in Conductive Network of Crosslinked Polypyrrole (PPy) Chains The process of example 1 was replicated with PEDOT/PSS being replaced by polypyrrole (PPy) network. The polypyrrole hydrogel was prepared by following the following procedure: Solution A was prepared by mixing 1 mL $H_2O$ and 0.5 mL phytic acid together and then injecting 142 μL pyrrole into the solution, which was sonicated for 1 min. Solution B was prepared by dissolving 0.114 g ammonium persulfate in 0.5 mL $H_2O$. The solution A and B were separately cooled to 4° C. and then solution B was added into solution A quickly to form a reacting precursor solution.

The LFP, $CuF_2$ and NCA primary particles were separately dispersed in a reacting precursor solution to form a suspension, which was rapidly spray-dried to form micro-droplets. These micro-droplets contain anode active material primary particles embedded in polypyrrole hydrogel. The micro-droplets were totally dried by removing all of the water content from the gel under vacuum at 60° C. for 24 hours.

EXAMPLE 3

Production of Networks of Crosslinked Polyaniline Chains-Protected Cathode Particles In some embodiments, the precursor may contain a monomer, an initiator, oxidizer or catalyst, a crosslinking agent, and an optional dopant. As an example, 3.6 ml solution A, which contains 400 mM aniline monomer and 120 mM phytic acid (as a crosslinking agent and a dopant), was added and mixed with 280 mg $V_2O_5$, $LiCoO_2$, or $LiMn_2O_4$ nanoparticles (as an anode active material) and optionally 40 mg carbon nanotubes or graphene oxide (GO) sheets (as a reinforcement material) in water. Subsequently, 1.2 ml solution B, containing 500 mM ammonium persulfate (oxidative initiator), was added into the above mixture and subjected to bath sonication for 1 min. The mixture suspension was spray-dried to form micro-droplets. In about 2-3 min, the solution changed color from brown to dark green and became viscous and gel-like, indicating in-situ polymerization of aniline monomer to form the PANi hydrogel.

The micro-droplets, with or without the presence of CNTs/GO sheets, were then vacuum-dried at 50° C. for 24 hours to obtain network of crosslinked PANi chains-protected cathode particles. The resulting multi-functional particulates (networks of PANi chains-embedded cathode particles), along with a SBR binder, and Super-P conductive additive were then made into a cathode electrode.

EXAMPLES 4

Heparin-Based Material as a Curing Agent for the Preparation of a Conducting Network of Polyaniline Chains The conducting networks of crosslinked PANi may be produced from a monomer using heparin-based crosslinking agent (e.g. instead of or in addition to phytic acid). Aqueous solutions of heparin (0.21% w/w) were prepared using 5M NaOH. Photo-crosslinkable heparin methacrylate (Hep-MA) precursors were prepared by combining heparin (porcine source, Mw ~1719 kDa) incubated with methacrylic anhydride (MA) and adjusted to pH=8. The degree of substitution (DS) of methacrylate groups covalently linked to heparin precursors was measured by 1H nuclear magnetic resonance. The DS was determined from integral ratios of peaks of the methacrylate groups at 6.2 ppm relative to the peak corresponding to methyl groups in heparin at 2.05 ppm.

Solutions used for photopolymerization were incubated with 2-methyl-1-[4-(hydeoxyethoxy)phenyl]-2-methyl-1-propanone (Irgacure 2959) to create final concentrations of 0.5% (w/w) of photoinitiator. LFP and NMC-311 particles were added into the solution as a cathode active material. The slurry was then made into micro-droplets using air suspension coating. Gels were photo-crosslinked using UV illumination for 30-60 min ($\lambda$ max=365 nm, 10 mW/cm$^2$). Hep-MA/PANI dual-networks were formed by sequentially incubating cross-linked Hep-MA hydrogels in aqueous solutions of ANI ([ANI]$_0$, between 0.1 and 2 M, 10 min) and acidic solutions of APS ([APS]$_0$, between 12.5 mM and 2 M, 20120 min). The gel fraction of Hep-MA/PANI dual networks was recovered by washing in di H$_2$O after oxidative polymerization. The micro-droplets were then vacuum-dried at 50° C. for 24 hours to obtain network of crosslinked PANi chains-protected cathode particles.

Various types of graphene sheets were used to reinforce the networks of crosslinked conductive chains, including pristine graphene, GO, RGO, graphene fluoride, and nitrogenated graphene. The preparation of these example graphene sheets is briefly discussed in Examples 5-9 below:

EXAMPLE 5

Graphene Oxide from Sulfuric Acid Intercalation and Exfoliation of MCMBs

MCMB (meso-carbon microbeads) were supplied by China Steel Chemical Co. This material has a density of about 2.24 g/cm$^3$ with a median particle size of about 16 µm. MCMBs (10 grams) were intercalated with an acid solution (sulfuric acid, nitric acid, and potassium permanganate at a ratio of 4:1:0.05) for 48 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 800° C.-1,100° C. for 30-90 seconds to obtain graphene samples. A small quantity of graphene was mixed with water and ultrasonicated at 60-W power for 10 minutes to obtain a suspension. A small amount was sampled out, dried, and investigated with TEM, which indicated that most of the NGPs were between 1 and 10 layers. The oxygen content of the graphene powders (GO or RGO) produced was from 0.1% to approximately 25%, depending upon the exfoliation temperature and time.

EXAMPLE 6

Oxidation and Exfoliation of Natural Graphite

Graphite oxide was prepared by oxidation of graphite flakes with sulfuric acid, sodium nitrate, and potassium permanganate at a ratio of 4:1:0.05 at 30° C. for 48 hours, according to the method of Hummers [U.S. Pat. No. 2,798, 878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 4. The intent was to remove all sulfuric and nitric acid residue out of graphite interstices. The slurry was dried and stored in a vacuum oven at 60° C. for 24 hours.

The dried, intercalated (oxidized) compound was exfoliated by placing the sample in a quartz tube that was inserted into a horizontal tube furnace pre-set at 1,050° C. to obtain highly exfoliated graphite. The exfoliated graphite was dispersed in water along with a 1% surfactant at 45° C. in a flat-bottomed flask and the resulting graphene oxide (GO) suspension was subjected to ultrasonication for a period of 15 minutes to obtain a homogeneous graphene-water suspension.

EXAMPLE 7

Preparation of Pristine Graphene Sheets

Pristine graphene sheets were produced by using the direct ultrasonication or liquid-phase exfoliation process. In a typical procedure, five grams of graphite flakes, ground to approximately 20 µm in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets were pristine graphene that had never been oxidized and were oxygen-free and relatively defect-free. There are substantially no other non-carbon elements.

EXAMPLE 8

Preparation of Graphene Fluoride (GF) Sheets

Several processes have been used by us to produce GF, but only one process is herein described as an example. In a typical procedure, highly exfoliated graphite (HEG) was prepared from intercalated compound C$_2$F.xClF$_3$. HEG was further fluorinated by vapors of chlorine trifluoride to yield fluorinated highly exfoliated graphite (FHEG). A pre-cooled Teflon reactor was filled with 20-30 mL of liquid pre-cooled ClF$_3$, and then the reactor was closed and cooled to liquid nitrogen temperature. Subsequently, no more than 1 g of HEG was put in a container with holes for ClF$_3$ gas to access the reactor. After 7-10 days, a gray-beige product with approximate formula C$_2$F was formed. GF sheets were then dispersed in halogenated solvents to form suspensions.

EXAMPLE 9

Preparation of Nitrogenated Graphene Sheets

Graphene oxide (GO), synthesized in Example 12, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene/urea mass ratios of 1/0.5, 1/1 and 1/2 are designated as N-1, N-2 and N-3 respectively and the nitrogen contents of these samples were 14.7, 18.2 and 17.5 wt. % respectively as determined by elemental analysis. These nitrogenated graphene sheets remain dispersible in water.

EXAMPLE 10

Cathode Particulates Containing $V_2O_5$ Particles Encapsulated by a Shell of Networks of Crosslinked Conductive Chains Cathode active material layers were prepared from $V_2O_5$ particles and graphene-embraced $V_2O_5$ particles, respectively. $V_2O_5$ particles were commercially available. Graphene-embraced $V_2O_5$ particles were prepared in-house. In a typical experiment, vanadium pentoxide gels were obtained by mixing $V_2O_5$ in a LiCl aqueous solution. The $Li^+$-exchanged gels obtained by interaction with LiCl solution (the Li:V molar ratio was kept as 1:1) was mixed with a GO suspension and then placed in a Teflon-lined stainless steel 35 ml autoclave, sealed, and heated up to 180° C. for 12 h. After such a hydrothermal treatment, the green solids were collected, thoroughly washed, ultrasonicated for 2 minutes, and dried at 70° C. for 12 h followed by mixing with another 0.1% GO in water, ultrasonicating to break down nano-belt sizes, and then spray-drying at 200° C. to obtain graphene-embraced $V_2O_5$ composite particulates.

For electrochemical testing, the working electrodes were prepared by mixing 85 wt. % active material (network of crosslinked PANi chains encapsulated or non-encapsulated particulates of $V_2O_5$, respectively), 7 wt. % acetylene black (Super-P), and 8 wt. % polyvinylidene fluoride (PVDF) binder dissolved in N-methyl-2-pyrrolidinoe (NMP) to form a slurry of 5 wt. % total solid content. After coating the slurries on Al foil, the electrodes were dried at 120° C. in vacuum for 2 h to remove the solvent before pressing. Then, the electrodes were cut into a disk ($\phi$=12 mm) and dried at 100° C. for 24 h in vacuum. Electrochemical measurements were carried out using CR2032 (3V) coin-type cells with lithium metal as the counter/reference electrode, Celgard 2400 membrane as separator, and 1 M $LiPF_6$ electrolyte solution dissolved in a mixture of ethylene carbonate (EC) and diethyl carbonate (DEC) (EC-DEC, 1:1 v/v). The cell assembly was performed in an argon-filled glove-box. The CV measurements were carried out using a CH-6 electrochemical workstation at a scanning rate of 1 mV/s.

The electrochemical performance of the particulates of sulfonated elastomer-encapsulated $V_2O_5$ particles and that of non-protected $V_2O_5$ were evaluated by galvanostatic charge/discharge cycling at a current density of 50 mA/g, using a LAND electrochemical workstation.

Figure 3:
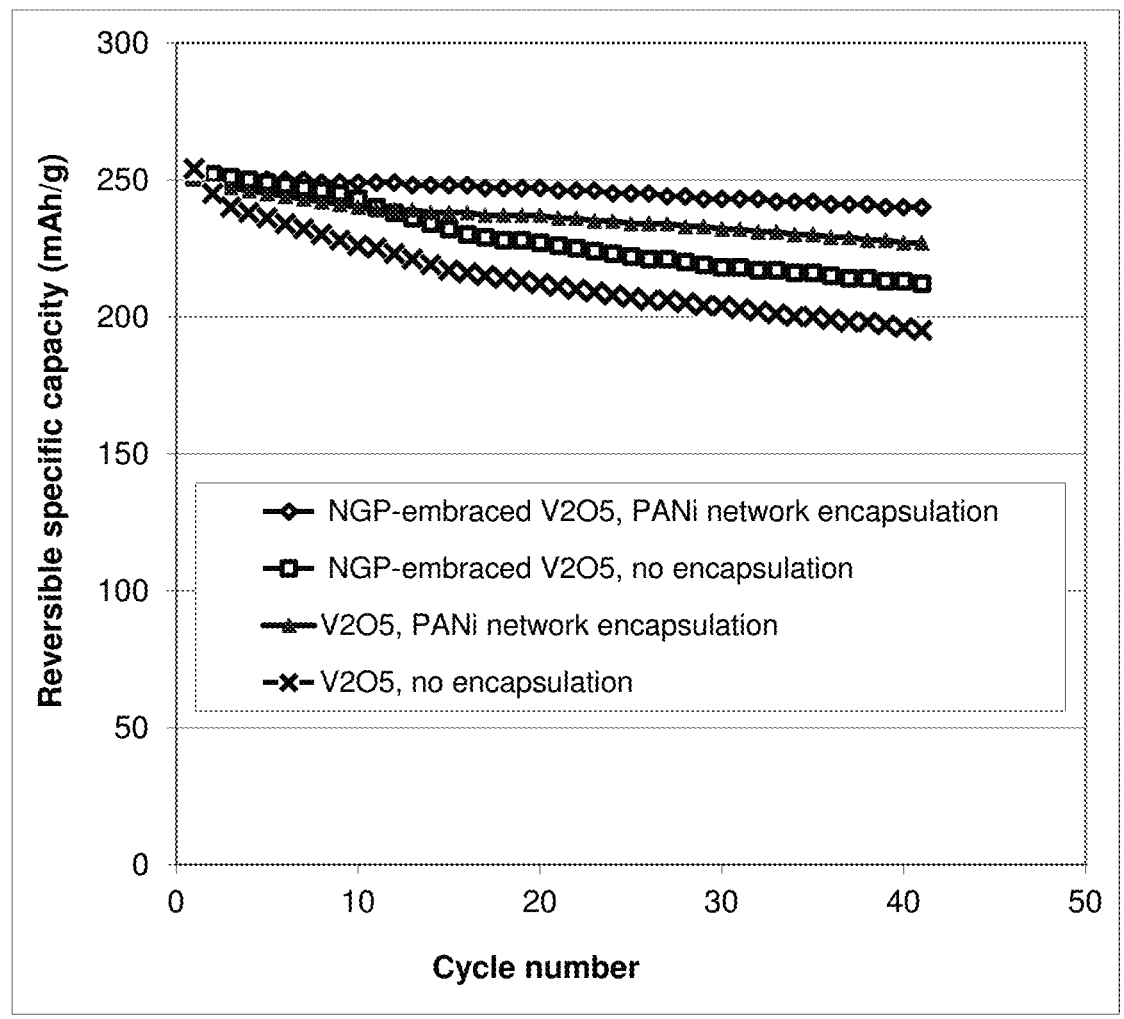
FIG. 3 The specific intercalation capacity curves of four lithium cells: cathode containing un-encapsulated V$_2$O$_5$ particles, cathode containing un-encapsulated but graphene-embraced V$_2$O$_5$ particles, cathode containing PANi network-encapsulated V$_2$O$_5$ particles, and cathode containing PANi network-encapsulated graphene-embraced V$_2$O$_5$ particles.

Summarized in FIG. 3 are the specific intercalation capacity curves of four lithium cells: cathode containing un-encapsulated $V_2O_5$ particles, cathode containing un-encapsulated but graphene-embraced $V_2O_5$ particles, cathode containing network of crosslinked PANi chains-encapsulated $V_2O_5$ particles, and cathode containing network of crosslinked PANi chains-encapsulated graphene-embraced $V_2O_5$ particles. As the number of cycles increases, the specific capacity of the un-encapsulated $V_2O_5$ electrode drops at the fastest rate. In contrast, the presently invented network of crosslinked PANi chains encapsulation provides the battery cell with a significantly more stable and higher specific capacity for a large number of cycles. These data have clearly demonstrated the surprising and superior performance of the presently invented network of crosslinked PANi chains encapsulation approach.

The protecting encapsulation shell of network of crosslinked PANi chains appears to be capable of reversibly deforming to a great extent without breakage when the active material particles expand and shrink. The network of crosslinked PANi chains also remains chemically bonded to the binder resin when the encapsulated particles expand or shrink. In contrast, the PVDF binder is broken or detached from some of the non-encapsulated active material particles. These were observed by using SEM to examine the surfaces of the electrodes recovered from the battery cells after some numbers of charge-discharge cycles.

EXAMPLE 11

Figure 4:
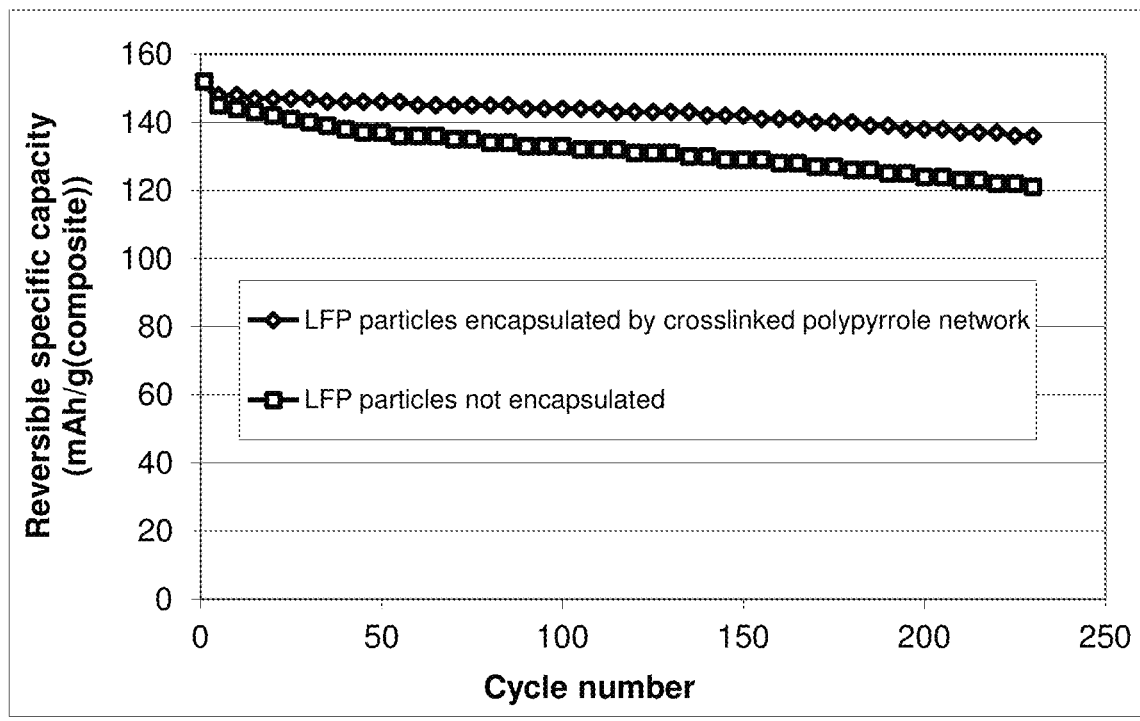
FIG. 4 The specific capacity values of two lithium battery cells having a cathode active material featuring (1) network of PPy chains-encapsulated carbon-coated LiFePO$_4$ particles and (2) carbon-coated LiFePO$_4$ particles without PPy network polymer encapsulation, respectively.

Networks of Crosslinked Polypyrrole Network-Encapsulated Lithium Iron Phosphate (LFP) Particles Commercially available lithium iron phosphate (LFP) particles were used in the present study. The battery cells from the crosslinked polypyrrole-encapsulated LFP particles and non-coated LFP particles were prepared using a procedure described in Example 1. FIG. 4 shows that the cathode prepared according to the presently invented crosslinked polypyrrole-encapsulated particulate approach offers a significantly more stable and higher reversible capacity compared to the un-coated LFP particle-based. The crosslinked polypyrrole network is more capable of holding the active material particles and conductive additive together, significantly improving the structural integrity of the active material electrode. The crosslinked polypyrrole network also acts to isolate the electrolyte from the active material yet still allowing for easy diffusion of lithium ions.

EXAMPLE 12

Metal Fluoride and Metal Chloride Particles Encapsulated by a Crosslinked Polypyrrole or PEDOT/PSS Network/Graphene Composite Commercially available powders of $CoF_3$, $MnF_3$, $FeF_3$, $VF_3$, $VOF_3$, $TiF_3$, and $BiF_3$ were subjected to high-intensity ball-milling to reduce the particle size down to approximately 0.5-2.3 μm. Each type of these metal fluoride particles, along with graphene sheets (as a conductive additive), were encapsulated with a thin layer of PEDOT/PSS network shell via the spray-drying method. For comparison, some amount of $FeF_3$ nanoparticles was encapsulated by a carbon shell. Carbon encapsulation is well-known in the art. Un-protected $FeF_3$ nanoparticles from the same batch were also investigated to determine and compare the cycling behaviors of the lithium-ion batteries containing these particles as the cathode active material.

Figure 5:
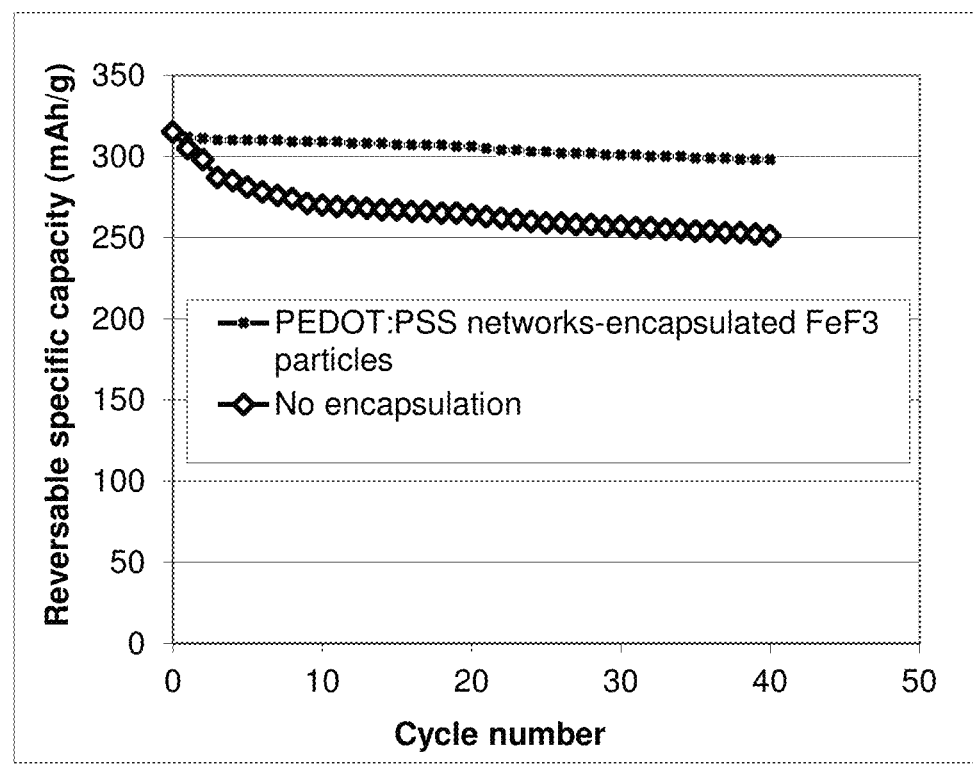
FIG. 5 The discharge capacity curves of two coin cells having two different types of cathode active materials: (1) PEDOT/PSS network chains-encapsulated metal fluoride particles and (2) non-encapsulated metal fluorides.

Shown in FIG. 5 are the discharge capacity curves of two coin cells having two different types of cathode active materials: (1) PEDOT/PSS network-encapsulated metal fluoride particles and (2) non-encapsulated metal fluorides. These results have clearly demonstrated that the PEDOT/PSS network encapsulation strategy provides excellent protection against capacity decay of a lithium metal battery featuring a high-capacity cathode active material.

The PEDOT/PSS network appears to be capable of reversibly deforming without breakage when the cathode active material particles expand and shrink. The PEDOT/PSS network also remains chemically bonded to the binder resin when the active particles expand or shrink. In contrast, both SBR (as a binder, not an encapsulating shell) and PVDF, the two conventional binder resins, are broken or detached from some of the non-encapsulated active material particles. The PEDOT/PSS network has contributed to the structural stability of the electrode layer. These were observed by using SEM to examine the surfaces of the electrodes recovered from the battery cells after some numbers of charge-discharge cycles.

EXAMPLE 13

Metal Naphthalocyanine-Reduced Graphene Oxide (FePc/RGO) Hybrid Particulates Encapsulated by PANi Network Chains Particles of combined FePc/graphene sheets were obtained by ball-milling a mixture of FePc and RGO in a milling chamber for 30 minutes. The resulting FePc/RGO mixture particles were potato-like in shape. Some of these mixture particles were encapsulated by PANi network chains using the pan-coating procedure. Two lithium cells were prepared, each containing a Li foil anode, a porous separator, and a cathode layer of FePc/RGO particles (encapsulated or un-encapsulated).

Figure 6:
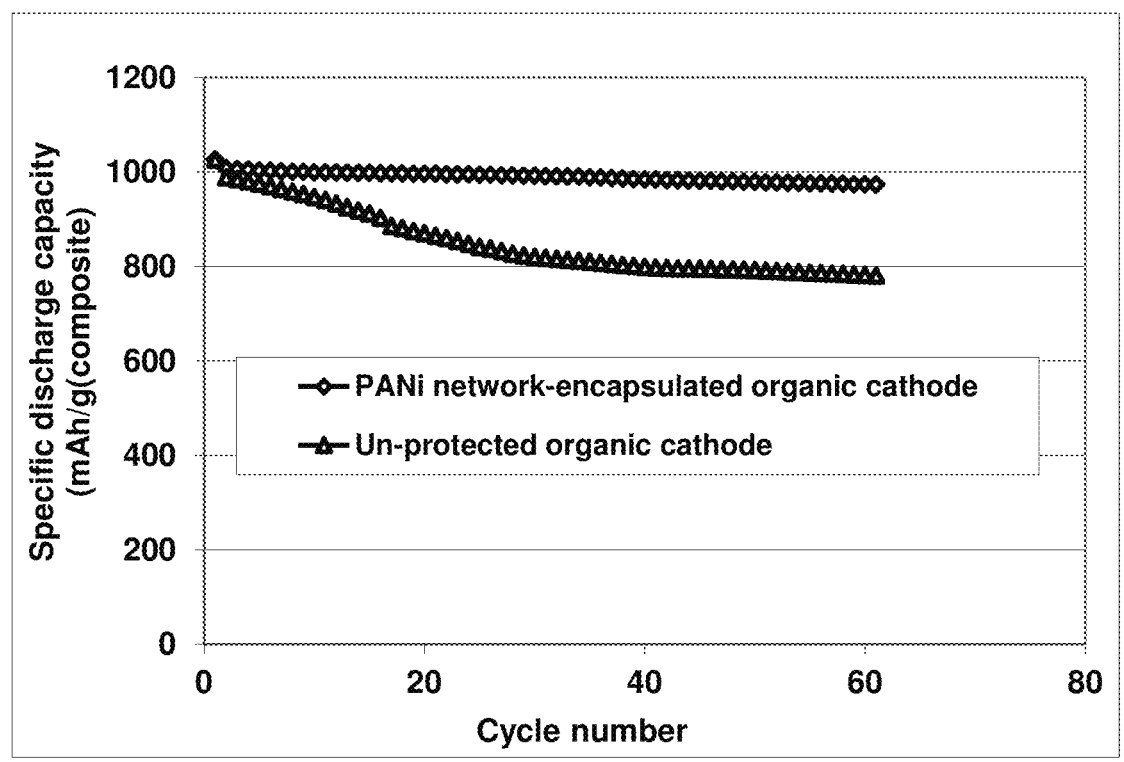
FIG. 6 Specific capacities of two lithium-FePc (organic) cells, each having Li foil as an anode active material and FePc/RGO mixture particles as the cathode active material (one cell containing un-encapsulated particles and the other containing particles encapsulated by PANi network chains).

The cycling behaviors of these 2 lithium cells are shown in FIG. 6, which indicates that the lithium-organic cell having PANi network chains-encapsulated particulates in the cathode layer exhibits a significantly more stable cycling response. This encapsulation PANi network chains reduces or eliminates direct contact between the catalytic transition metal element (Fe) and the electrolyte, yet still being permeable to lithium ions. This shell also completely eliminates the dissolution of naphthalocyanine compounds in the liquid electrolyte. This approach has significantly increased the cycle life of all lithium-organic batteries.

EXAMPLE 14

Effect of Lithium Ion-Conducting Additive in an Elastomer Shell

A wide variety of lithium ion-conducting additives were added to several different sulfonated elastomer materials to prepare encapsulation shell materials for protecting core particles of active material. We have discovered that these elastomer materials are suitable encapsulation shell materials provided that their lithium ion conductivity at room temperature is no less than $10^{-7}$ S/cm. With these materials, lithium ions appear to be capable of readily diffusing in and out of the encapsulation shell having a thickness no greater than 1 μm. For thicker shells (e.g. 10 μm), a lithium ion conductivity at room temperature no less than $10^{-4}$ S/cm would be required.

TABLE 1

Lithium ion conductivity of various conducting polymer network composite compositions as a shell material for protecting active material particles.

| Sample No. | Lithium-conducting additive | Conducting polymer network (0.3-2 μm thick) | Li-ion conductivity (S/cm) |
|---|---|---|---|
| E-1s | $Li_2CO_3$ + $(CH_2OCO_2Li)_2$ | 70-99% PANi, 2% RGO | $4.3 \times 10^{-6}$ to $5.6 \times 10^{-3}$ S/cm |
| E-2s | $Li_2CO_3$ + $(CH_2OCO_2Li)_2$ | 65-99% PANi, 8% pristine graphene | $3.6 \times 10^{-5}$ to $9.5 \times 10^{-4}$ S/cm |
| E-3s | $Li_2CO_3$ + $(CH_2OCO_2Li)_2$ | 65-80% PANi, 15% RGO | $9.8 \times 10^{-6}$ to $1.3 \times 10^{-3}$ S/cm |
| D-4s | $Li_2CO_3$ + $(CH_2OCO_2Li)_2$ | 70-99% PANi, 12% nitrogenated graphene | $2.8 \times 10^{-6}$ to $8.8 \times 10^{-4}$ S/cm |
| D-5s | $Li_2CO_3$ + $(CH_2OCO_2Li)_2$ | 75-99% PPy | $3.4 \times 10^{-5}$ to $9.8 \times 10^{-3}$ S/cm |
| B1s | LiF + LiOH + $Li_2C_2O_4$ | 80-99% PPy | $3.4 \times 10^{-6}$ to $8.5 \times 10^{-4}$ S/cm |
| B2s | LiF + HCOLi | 80-99% PPy | $6.9 \times 10^{-6}$ to $6.8 \times 10^{-3}$ S/cm |
| B3s | LiOH | 70-99% PPy | $5.6 \times 10^{-5}$ to $5.5 \times 10^{-3}$ S/cm |
| B4s | $Li_2CO_3$ | 70-99% PPy | $5.4 \times 10^{-5}$ to $7.7 \times 10^{-3}$ S/cm |
| B5s | $Li_2C_2O_4$ | 70-99% PPy | $3.7 \times 10^{-5}$ to $3.4 \times 10^{-3}$ S/cm |
| B6s | $Li_2CO_3$ + LiOH | 70-99% PEDDOT/PSS | $2.7 \times 10^{-5}$ to $4.9 \times 10^{-3}$ S/cm |
| C1s | $LiClO_4$ | 70-99% PEDDOT/PSS | $6.8 \times 10^{-5}$ to $6.4 \times 10^{-3}$ S/cm |
| C2s | $LiPF_6$ | 70-99% PEDDOT/PSS | $5.9 \times 10^{-5}$ to $2.9 \times 10^{-3}$ S/cm |
| C3s | $LiBF_4$ | 70-99% PEDDOT/PSS | $4.6 \times 10^{-5}$ to $7.8 \times 10^{-4}$ S/cm |
| C4s | LiBOB + $LiNO_3$ | 70-99% PEDDOT/PSS | $1.5 \times 10^{-5}$ to $9.2 \times 10^{-4}$ S/cm |
| S1s | Sulfonated polyaniline | 85-99% PANi | $8.3 \times 10^{-6}$ to $1.2 \times 10^{-3}$ S/cm |
| S2s | Sulfonated SBR | 85-99% PANi | $8.3 \times 10^{-6}$ to $6.8 \times 10^{-4}$ S/cm |
| S3s | Sulfonated PVDF | 80-99% PANi | $5.8 \times 10^{-6}$ to $6.4 \times 10^{-4}$ S/cm |
| S4s | Polyethylene oxide | 80-99% PANi | $6.9 \times 10^{-6}$ to $5.9 \times 10^{-4}$ S/cm |

Some advantages of the present disclosure may be summarized in the following:
(1) The conducting polymer network encapsulation strategy is surprisingly effective in alleviating the cathode expansion/shrinkage-induced capacity decay problems.
(2) The encapsulation of high-capacity cathode active material particles by carbon or other non-conducting polymer network protective materials does not provide much benefit in terms of improving cycling stability of a lithium-ion battery
(3) This encapsulation strategy reduces or eliminates direct contact between the catalytic transition metal element (e.g. Fe, Mn, Ni, Co, etc.) commonly used in a cathode active material and the electrolyte, thereby reducing/eliminating catalytic decomposition of the electrolyte.

I claim:
1. A cathode electrode for a lithium battery, said cathode electrode comprising multiple particulates of a cathode active material, wherein at least one of said particulates has a diameter from 100 nm to 50 μm and comprises a conducting polymer network composite comprising one or a plurality of primary particles of a cathode active material that are partially or totally encapsulated by, embedded in, dispersed in, or bonded by an electrically and ionically conducting network of cross-linked polymer chains having a lithium ion conductivity from $10^{-8}$ to $5 \times 10^{-2}$ S/cm and an electron conductivity from $10^{-8}$ to $10^3$ S/cm, wherein said primary particles have a diameter or thickness from 0.5 nm to 20 μm.

2. The cathode electrode of claim 1, wherein said conducting network of cross-linked polymer chains comprises a conjugated polymer selected from polyacetylene, polythiophene, poly(3-alkylthiophenes), polypyrrole, polyaniline, poly(isothianaphthene), poly(3,4-ethylenedioxythiophene), alkoxy-substituted poly(p-phenylene vinylene), poly(2,5-bis (cholestanoxy) phenylene vinylene), poly(p-phenylene vinylene), poly(2,5-dialkoxy) paraphenylene vinylene, poly [(1,4-phenylene-1,2-diphenylvinylene)], poly(3',7'-dimethyloctyloxy phenylene vinylene), polyparaphenylene, polyparaphenylene, polyparaphenylene sulphide, polyheptadiyne, poly(3-hexylthiophene), poly(3-octylthiophene), poly(3-cyclohexylthiophene), poly(3-methyl-4-cyclohexylthiophene), poly(2,5-dialkoxy-1,4-phenyleneethynylene), poly(2-decyloxy-1,4-phenylene), poly(9,9-dioctylfluorene), polyquinoline, a derivative thereof, a copolymer thereof, a sulfonated version thereof, or a combination thereof.

3. The cathode electrode of claim 1, wherein said composite further contains an electron-conducting filler dispersed in said network of cross-linked polymer chains wherein said electron-conducting filler is selected from carbon nanotube, carbon nano-fiber, nanocarbon particle, metal nanoparticle, metal nano-wire, graphene, or a combination thereof, wherein said graphene is selected from pristine graphene, graphene oxide, reduced graphene oxide, graphene fluoride, graphene chloride, nitrogenated graphene, hydrogenated graphene, doped graphene, functionalized graphene, or a combination thereof and said graphene comprise single-layer graphene or few-layer graphene, wherein said few-layer graphene is defined as a graphene platelet formed of less than 10 graphene planes.

4. The cathode electrode of claim 1, wherein said cathode active material is selected from an inorganic material, an organic material, a polymeric material, or a combination thereof.

5. The cathode electrode of claim 4, wherein said inorganic material is selected from a metal oxide, metal phosphate, metal silicide, metal selenide, transition metal sulfide, sulfur, lithium polysulfide, selenium, lithium selenide, or a combination thereof.

6. The cathode electrode of claim 4, wherein said inorganic material is selected from a lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphate, lithium metal silicide, or a combination thereof.

7. The cathode electrode of claim 4, wherein said inorganic material is selected from a metal fluoride or metal chloride including the group consisting of $CoF_3$, $MnF_3$, $FeF_3$, $VF_3$, $VOF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, and combinations thereof.

8. The cathode electrode of claim 4, wherein said inorganic material is selected from a lithium transition metal silicate, denoted as $Li_2MSiO_4$ or $Li_2Ma_xMb_ySiO_4$, wherein M and Ma are selected from Fe, Mn, Co, Ni, V, or VO; Mb is selected from Fe, Mn, Co, Ni, V, Ti, Al, B, Sn, or Bi; and $x+y \leq 1$.

9. The cathode electrode of claim 4, wherein said inorganic material is selected from a transition metal dichalcogenide, a transition metal trichalcogenide, or a combination thereof.

10. The cathode electrode of claim 4, wherein said inorganic material is selected from $TiS_2$, $TaS_2$, $MoS_2$, $NbSe_3$, $MnO_2$, $CoO_2$, an iron oxide, a vanadium oxide, or a combination thereof.

11. The cathode electrode of claim 5, wherein said metal oxide contains a vanadium oxide selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1 < x < 5$.

12. The cathode electrode of claim 5, wherein said metal oxide or metal phosphate is selected from a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

13. The cathode electrode of claim 4, wherein said inorganic material is selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof.

14. The cathode electrode of claim 4, wherein said organic material or polymeric material is selected from Poly(anthraquinonyl sulfide) (PAQS), a lithium oxocarbon, 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material, Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ([(NPS$_2$)$_3$]n), lithiated 1,4,5,8naphthalenetetraol formaldehyde polymer, Hexaazatrinaphthylene (HATN), Hexaazatriphenylene hexacarbonitrile (HAT(CN)$_6$), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof.

15. The cathode electrode of claim 14, wherein said thioether polymer is selected from Poly[methanetetryl-tetra (thiomethylene)] (PMTTM), Poly(2,4-dithiopentanylene) (PDTP), a polymer containing Poly(ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1,3-dithiolan-2-yl)benzene) (PDDTB), poly(tetrahydrobenzodithiophene) (PTHBDT), poly[1,2,4,5-tetrakis (propylthio)benzene] (PTKPTB, or poly[3,4(ethylenedithio) thiophene](PEDTT).

16. The cathode electrode of claim 4, wherein said organic material contains a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

17. The cathode electrode of claim 1, wherein said cathode active material is in a form of nanoparticle, nanowire, nanofiber, nanotube, nanosheet, nanobelt, nanoribbon, nanodisc, nanoplatelet, or nanohorn having a thickness or diameter from 0.5 nm to 100 nm.

18. The cathode electrode of claim 1, wherein said one or a plurality of particles is coated with a layer of carbon prior to being encapsulated.

19. The cathode electrode of claim 1, wherein said particulate further contains a graphite or carbon material encapsulated therein.

20. The cathode electrode of claim 19, wherein said graphite or carbon material is selected from polymeric carbon, amorphous carbon, chemical vapor deposition carbon, coal tar pitch, petroleum pitch, meso-phase pitch, carbon black, coke, acetylene black, activated carbon, fine expanded graphite particle with a dimension smaller than 100 nm, artificial graphite particle, natural graphite particle, or a combination thereof.

21. The cathode electrode of claim 1, wherein said network of cross-linked polymer chains further contains from 0.1% to 40% by weight of a lithium ion-conducting additive dispersed in said network of cross-linked polymer chains.

22. The cathode electrode of claim 21, wherein said lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$.

23. The cathode electrode of claim 21, wherein said lithium ion-conducting additive contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoromethanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

24. The cathode electrode of claim 21, wherein said lithium ion-conducting additive contains a lithium ion-conducting polymer selected from poly(ethylene oxide) (PEO), Polypropylene oxide (PPO), poly(acrylonitrile) (PAN), poly(methyl methacrylate) (PMMA), poly(vinylidene fluoride) (PVdF), Poly bis-methoxy ethoxyethoxide-phosphazenex, Polyvinyl chloride, Polydimethylsiloxane, poly(vinylidene fluoride)-hexafluoropropylene (PVDF-HFP), a sulfonated derivative thereof, or a combination thereof.

25. A powder mass of a cathode active material for a lithium battery cathode electrode, said powder mass comprising multiple particulates of a cathode active material, wherein at least one of said particulates has a diameter from 100 nm to 50 μm and comprises a conducting polymer network composite comprising one or a plurality of primary particles of cathode active material that are encapsulated by, embedded in, dispersed in, or bonded by an electrically and ionically conducting network of cross-linked polymer chains having a lithium ion conductivity from $10^{-8}$ to $5\times10^{-2}$ S/cm and an electron conductivity from $10^{-8}$ to $10^3$ S/cm, wherein said primary particles have a diameter or thickness from 0.5 nm to 20 μm.

26. The powder mass of claim 25, wherein said conducting network of cross-linked polymer chains comprises a conjugated polymer selected from polyacetylene, polythiophene, poly(3-alkylthiophenes), polypyrrole, polyaniline, poly(isothianaphthene), poly(3,4-ethylenedioxythiophene), alkoxy-substituted poly(p-phenylene vinylene), poly(2,5-bis (cholestanoxy) phenylene vinylene), poly(p-phenylene vinylene), poly(2,5-dialkoxy) paraphenylene vinylene, poly [(1,4-phenylene-1,2-diphenylvinylene)], poly(3',7'-dimethyloctyloxy phenylene vinylene), polyparaphenylene, polyparaphenylene, polyparaphenylene sulphide, polyheptadiyne, poly(3-hexylthiophene), poly(3-octylthiophene), poly(3-cyclohexylthiophene), poly(3-methyl-4-cyclohexylthiophene), poly(2,5-dialkoxy-1,4-phenyleneethynylene), poly(2-decyloxy-1,4-phenylene), poly(9,9-dioctylfluorene), polyquinoline, a derivative thereof, a copolymer thereof, a sulfonated version thereof, or a combination thereof.

27. The powder mass of claim 25, wherein said conducting network of cross-linked polymer chains further contains an electron-conducting filler dispersed in said conducting network of cross-linked polymer chains wherein said electron-conducting filler is selected from a carbon nanotube, carbon nano-fiber, nanocarbon particle, metal nanoparticle, metal nano-wire, electron-conducting polymer, graphene, or a combination thereof, wherein said graphene is selected from pristine graphene, graphene oxide, reduced graphene oxide, graphene fluoride, graphene chloride, nitrogenated graphene, hydrogenated graphene, doped graphene, functionalized graphene, or a combination thereof and said graphene comprises single-layer graphene or few-layer graphene, wherein said few-layer graphene is defined as a graphene platelet formed of less than 10 graphene planes.

28. The powder mass of claim 25, further comprising graphite particles, carbon particles, meso-phase microbeads, carbon or graphite fibers, carbon nanotubes, graphene sheets, or a combination thereof mixed with said multiple particulates.

29. The powder mass of claim 25, wherein said sulfonated elastomeric material further contains from 0.1% to 40% by weight of a lithium ion-conducting additive dispersed in said sulfonated elastomeric material.

30. The powder mass of claim 29, wherein said lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0<x\leq1$, $1\leq y\leq4$.

31. The powder mass of claim 29, wherein said lithium ion-conducting additive contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

32. A lithium battery containing an optional cathode current collector, the cathode electrode as defined in claim 1, an anode active material layer, an optional anode current collector, an electrolyte in ionic contact with said anode active material layer and said cathode active material layer, and an optional porous separator disposed between said anode active material layer and said cathode active material layer.

33. The lithium battery of claim 32, which is a lithium-ion battery, lithium metal secondary battery, or lithium-air battery.

34. A method of producing the cathode electrode of claim 1, comprising (A) dispersing a plurality of primary particles of a cathode active material, having a diameter or thickness from 0.5 nm to 20 µm, in a liquid mixture of a monomer or oligomer for a conjugated polymer, an initiator, and a cross-linking agent to form a reactive slurry; (B) forming the reactive slurry into micro-droplets and polymerizing and curing the monomer or oligomer in said micro-droplets to form the multiple particulates; and (C) mixing the multiple particulates with a binder and an optional conductive additive to form said cathode electrode.

35. The method of claim 34, wherein said reactive slurry further comprises a dopant, a reinforcement material, a lithium ion-conducting additive, an electron-conducting additive, or a combination thereof.

36. The method of claim 34, wherein said step (B) of forming micro-droplets comprises a procedure selected from pan-coating, air-suspension coating, centrifugal extrusion, vibration-nozzle encapsulation, spray-drying, coacervation-phase separation, interfacial polycondensation or interfacial cross-linking, in-situ polymerization, matrix polymerization, extrusion and palletization, or a combination thereof.

37. The method of claim 35, wherein said micro-droplets contain water or a liquid solvent and the method further comprises a step of removing said water or solvent.

38. The method of claim 35, wherein said reactive slurry further comprises a high-strength material selected from carbon nanotubes, carbon nano-fibers, carbon or graphite fibers, graphene sheets, expanded graphite flakes, polymer fibrils, glass fibers, ceramic fibers, metal filaments or metal nano-wires.

* * * * *